US 11,299,296 B2

(12) United States Patent
Mena et al.

(10) Patent No.: US 11,299,296 B2
(45) Date of Patent: Apr. 12, 2022

(54) SPACECRAFT

(71) Applicant: AIRBUS DEFENCE AND SPACE SAS, Toulouse (FR)

(72) Inventors: Fabrice Mena, Teulat (FR); Jean-Christophe Dunat, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 796 days.

(21) Appl. No.: 16/308,247

(22) PCT Filed: Jun. 9, 2017

(86) PCT No.: PCT/FR2017/051454
§ 371 (c)(1),
(2) Date: Dec. 7, 2018

(87) PCT Pub. No.: WO2017/212180
PCT Pub. Date: Dec. 14, 2017

(65) Prior Publication Data
US 2019/0263542 A1    Aug. 29, 2019

(30) Foreign Application Priority Data
Jun. 10, 2016  (FR) ..................... 16 55371

(51) Int. Cl.
*B64G 1/50*  (2006.01)
*B64G 1/10*  (2006.01)

(52) U.S. Cl.
CPC ............. *B64G 1/503* (2013.01); *B64G 1/10* (2013.01); *B64G 1/506* (2013.01)

(58) Field of Classification Search
CPC ................ B64G 1/503; B64G 1/506
(Continued)

(56) References Cited

U.S. PATENT DOCUMENTS

| 3,402,761 | A | * | 9/1968 | Swet | B64G 1/506 165/272 |
| 3,489,203 | A | * | 1/1970 | Fischell | B64G 1/506 165/274 |

(Continued)

FOREIGN PATENT DOCUMENTS

| EP | 1 006 769 | 6/2000 |
| JP | 03 000597 | 1/1991 |
| WO | WO 2016/097577 | 6/2016 |

OTHER PUBLICATIONS

International Search Report, PCT/FR2017/051454, dated Sep. 19, 2017.

*Primary Examiner* — Christopher P Ellis
(74) *Attorney, Agent, or Firm* — Nixon & Vanderhye P.C.

(57) ABSTRACT

Disclosed is a spacecraft including: a housing defining an exterior space, the housing having a first face and a second face; and first and second radiators carried by the first and second faces, the first and second radiators each having an inner main face, an outer main face, and side faces. The spacecraft includes a first auxiliary radiator and a first auxiliary heat transfer device thermally connecting the first auxiliary radiator to the inner main face of the second radiator, the first auxiliary radiator being arranged in a first portion of the exterior space defined by the outer main face of the first radiator and by first planes containing the side faces of the first radiator. The first auxiliary heat transfer device includes a heat conducting device. The first auxiliary radiator is composed solely of one or two radiating panels supporting the heat conducting device.

20 Claims, 16 Drawing Sheets

(58) Field of Classification Search
USPC .................................................... 244/171.8
See application file for complete search history.

(56) References Cited

U.S. PATENT DOCUMENTS

| | | | | |
|---|---|---|---|---|
| 4,162,701 | A * | 7/1979 | Ollendorf | B64G 1/50 |
| | | | | 165/104.11 |
| 5,332,030 | A | 7/1994 | Spencer et al. | |
| 5,806,803 | A * | 9/1998 | Watts | B64G 1/503 |
| | | | | 165/41 |
| 5,954,298 | A * | 9/1999 | Basuthakur | B64G 1/50 |
| | | | | 244/171.8 |
| 6,478,258 | B1 * | 11/2002 | Yee | B64G 1/503 |
| | | | | 165/41 |
| 6,776,220 | B1 | 8/2004 | Low et al. | |
| 6,923,249 | B1 * | 8/2005 | Porter | H01M 10/667 |
| | | | | 165/104.14 |
| 7,967,256 | B2 * | 6/2011 | Wong | H01M 10/6552 |
| | | | | 244/171.8 |
| 9,828,116 | B1 * | 11/2017 | Mena | B64G 1/503 |
| 2004/0188568 | A1 * | 9/2004 | Gayrard | B64G 1/641 |
| | | | | 244/171.8 |
| 2004/0232284 | A1 * | 11/2004 | Tjiptahardja | B64G 1/506 |
| | | | | 244/171.8 |
| 2010/0001141 | A1 * | 1/2010 | Jondeau | B64G 1/50 |
| | | | | 244/158.1 |
| 2010/0243817 | A1 * | 9/2010 | McKinnon | B64G 1/50 |
| | | | | 244/171.8 |
| 2015/0069187 | A1 * | 3/2015 | McKinnon | B64G 1/50 |
| | | | | 244/171.8 |
| 2016/0288926 | A1 * | 10/2016 | Smith | B64G 1/503 |
| 2017/0361951 | A1 * | 12/2017 | Walker | B64G 1/402 |

* cited by examiner

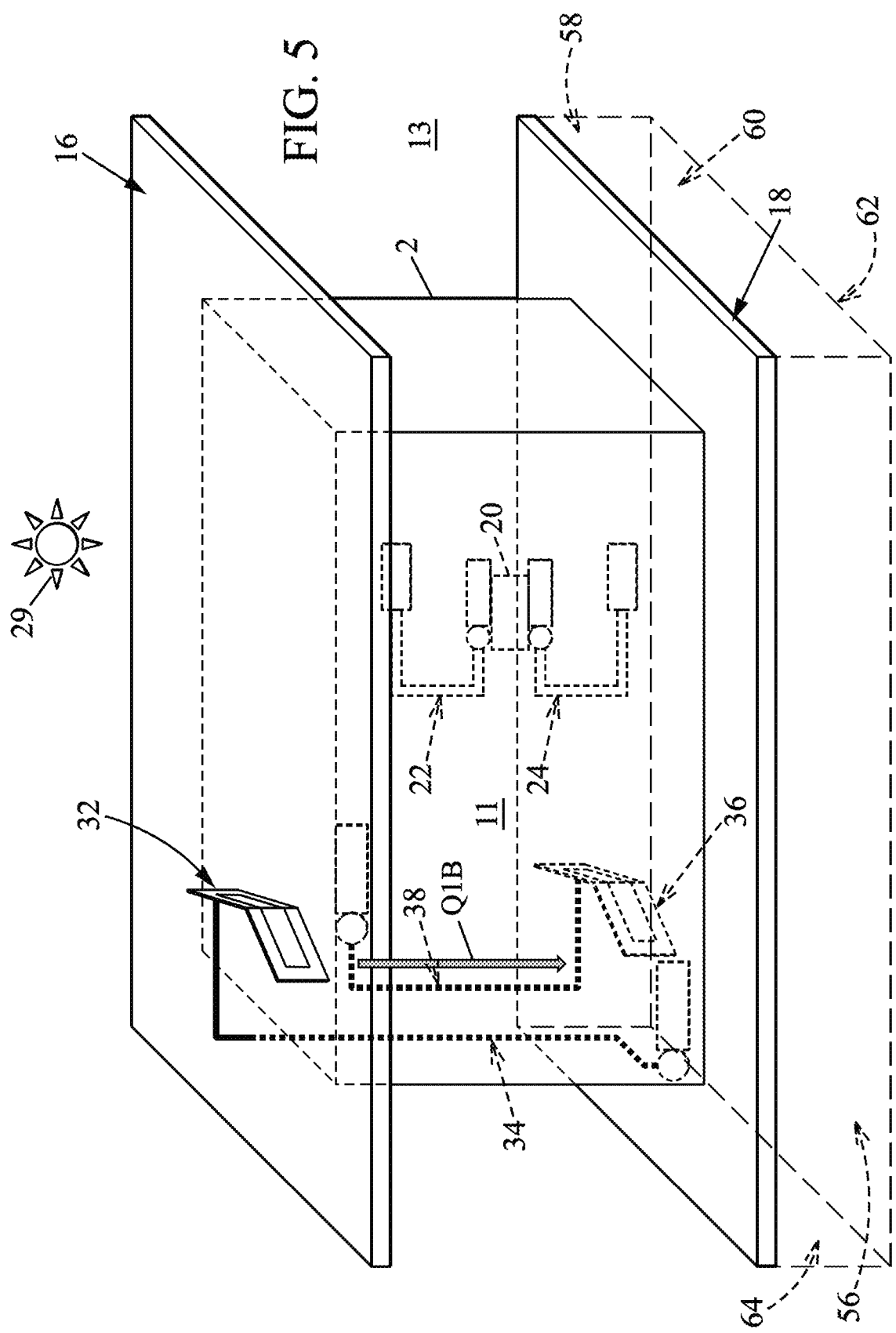

SPACECRAFT

The present invention relates to a spacecraft and in particular to a geostationary satellite.

Due to the revolution of the earth around the sun, the different faces of a geostationary satellite do not receive the same amount of solar radiation across the seasons. This results in significant differences in temperatures between the +Y and −Y sides of the satellite, as well as cyclical variations in these temperatures across the seasons. Thus, as can be seen in FIG. 1, during the winter solstice (WS), the +Y face, exposed to solar radiation, exhibits higher temperatures than the −Y face located in the shade. During the summer solstice (SS), it is the −Y face which has high temperatures because it is exposed to solar radiation while the +Y face is in the shade. During the winter and summer equinoxes (EQ), the +Y and −Y faces present smaller temperature differences than during the winter (WS) and summer (SS) solstices.

These temperature differences between the +Y face and the −Y face, as well as the temperature fluctuations across the seasons, stress the satellite and its payload.

To reduce these temperature differences, various palliative systems have already been put in place. However, these palliative systems are not completely satisfactory.

Patent WO 2016/097577 describes a spacecraft equipped with an auxiliary radiator. This patent is an opposable document only under EPC Article 54(3).

U.S. Pat. No. 6,776,220 discloses, for example, heat pipes arranged between the radiator fixed on the +Y face and the radiator fixed on the −Y face. These heat pipes can transfer a fraction of the excess heat from a radiator located on the sunward side to a radiator located in the shade. However, despite the presence of these heat pipes, the temperature differences between the +Y face and the −Y face remain significant, especially during the summer and winter solstices when they can still reach about 10° C. to 15° C., since the radiator in the shade is already highly stressed by the heat dissipation from the electronic equipment that it is cooling. The radiator located in the shade can therefore receive only a small amount of excess heat from the radiator located in the sun.

Unlike U.S. Pat. No. 6,776,220, the present invention uses an auxiliary radiator which is not in a direct heat exchange with electronic equipment. In addition, this auxiliary radiator is located in the shade when the radiator of the opposite wall is located on the sunward side. The auxiliary radiator according to the present invention can thus receive a large amount of heat from the radiator located in the sun, in order to lower the temperature differences between the +Y and −Y walls.

Finally, this heat balance is obtained with the installation of a thermal energy transport system such as LHP or MRL which, unlike U.S. Pat. No. 6,776,220, requires only the installation of two pipes between the two radiators, instead of a relatively large number of heat pipes of significant total mass.

Electric heating elements have also been used to warm the satellite faces located on the shadow side. However, the heating elements are of limited efficiency and require over-engineering the satellite's electric power system. This over-engineering significantly increases the cost of the electric power system. In addition, heating the cold portions of the satellite also causes an increase in the temperature of its hot portions. However, these hot portions are already close to their limit operating temperature.

Moreover, these temperature differences between the satellite faces must be reproduced during satellite qualification tests. Creating these thermal differences and their seasonal fluctuations in a vacuum atmosphere is complex.

The aim of the present invention is to limit the temperature differences between the +Y and −Y faces and to reduce the temperature variations across the seasons for a same face.

For this purpose, the object of the invention is a spacecraft comprising:
 a housing defining an interior space and an exterior space, the housing having a north face, a south face opposite to the north face, an east face, and a west face opposite to the east face, an Earth face, and a zenith (anti-Earth) face opposite to the zenith face,
 a first radiator carried by a face among the north face and south face, and
 a second radiator carried by the other face among the north face and south face,
 the first radiator and the second radiator each having an inner main face, an outer main face opposite to the inner main face, longitudinal side faces, and transverse side faces,
 characterized in that the spacecraft further comprises a first auxiliary radiator and a first auxiliary heat transfer device thermally connecting said first auxiliary radiator to the inner main face of the second radiator, the first auxiliary radiator being arranged in a first portion of the exterior space, said first portion being defined by the outer main face of the first radiator and by first planes containing the side faces of the first radiator,
 and in that said first auxiliary heat transfer device comprises a heat conducting device, said first auxiliary radiator being composed solely of one or two radiating panels supporting said heat conducting device, called carrier radiating panel(s).

Advantageously, said first auxiliary radiator is less bulky and less cumbersome to accommodate on the satellite structure, and is easier to install and to adapt to different satellite configurations.

Advantageously, the first heat transfer device and first auxiliary radiator assembly enables cooling the second radiator when the latter is exposed to solar radiation, meaning during the winter solstice and summer solstice. The cooling of the second radiator enables more efficient cooling of the electronic equipment.

Advantageously, the decrease in temperature variations of the faces of the spacecraft should make it possible to reduce the duration of the qualification tests in thermal vacuum. This would result in a significant gain in terms of the cost and design time of a spacecraft.

Advantageously, the first auxiliary heat transfer device and first auxiliary radiator assembly can be easily assembled and disassembled on a spacecraft during design or be added to an existing spacecraft. The addition of this assembly does not require modifying the architecture of an existing spacecraft.

Advantageously, the first heat transfer device and first auxiliary radiator assembly has a small footprint. This assembly makes it possible to increase the heat rejection capacity of the spacecraft without increasing the size of the first and second radiators.

Advantageously, the first heat transfer device and first auxiliary radiator assembly has a low mass and cost.

According to some particular embodiments, the spacecraft comprises one or more of the following characteristics:
 Said carrier radiating panel or panels of the first auxiliary radiator have a width L comprised between 10 centimeters and 60 centimeters and preferably between 40 centimeters and 50 centimeters, said carrier radiating panel or panels being arranged at a distance D comprised between 1 meters and 5.2 meters and preferably between 4.3 meters and 5 meters with respect to a plane containing the zenith face.

Advantageously, this dimension and this positioning of the first auxiliary radiator make it possible to prevent light rays reflected by the radiator from reaching the lower portion of the solar panel.

Said carrier radiating panel or panels extend(s) perpendicularly to the first radiator, said carrier radiating panel or panels being at an angle comprised between 10° and 35° with respect to at least one face among the Earth face and the zenith face.

Advantageously, the first auxiliary radiator according to this first embodiment is of simpler and faster design, because it allows the use of slightly curved heat pipes that are one piece, without requiring the use of complex and expensive fittings that are long to install.

Said carrier panel or panels has (have) the shape of a rectangular trapezoid having an obtuse angle (ρ); said obtuse angle (ρ) being adjacent to a longitudinal side face of the first radiator.

This shape makes it possible to have a large heat exchange surface while remaining within the space available under the nosecone.

The spacecraft comprises a solar panel fixed on the north face, and the first auxiliary radiator is composed of two carrier radiating panels arranged relative to each other so as to form a V pointing towards said solar panel.

The first auxiliary radiator is composed of a single carrier radiating panel extending parallel to at least one face among the Earth face and the zenith face.

Advantageously, the first auxiliary radiator according to this second embodiment is of simple design.

The first auxiliary radiator comprises at least one radiating panel without any heat conducting device, called non-carrier radiating panel or panels, said non-carrier radiating panel or panels extending perpendicularly to at least one face among the north face and the south face.

Said non-carrier radiating panel or panels extend(s) perpendicularly to at least one face among the zenith face and the Earth face.

The carrier radiating panel comprises a first main face, and a second main face directed towards the Earth and opposite to the first main face, and the non-carrier radiating panel or panels is (are) fixed to the first main face.

Said first auxiliary radiator comprises a plurality of non-carrier radiating panels having different widths, and said non-carrier radiating panel of greatest width is arranged in a central portion of the carrier radiating panel.

The first auxiliary radiator is composed of a single radiating panel extending in a plane perpendicular to the first radiator and to a face among the Earth face and the zenith face.

The first auxiliary radiator is composed of a single radiating panel extending in a plane perpendicular to a face among the Earth face and the zenith face, said plane being at an angle of about 23.5 degrees relative to the first radiator.

Advantageously, the first auxiliary radiator according to this embodiment is easier to install.

The first auxiliary radiator is composed of two carrier radiating panels and two radiating panels without any heat conducting device, said carrier radiating panels being fixed to each other so that the midplane of one carrier radiating panel forms an acute angle with the midplane of the other carrier radiating panel, each carrier radiating panel further being fixed to a radiating panel without any heat conducting device so that the midplane of a carrier radiating panel forms an acute angle with the midplane of the radiating panel without any heat conducting device.

The carrier radiating panel or panels is (are) implemented in a honeycomb structure.

Advantageously, the auxiliary radiator is more rigid.

At least one carrier radiating panel is covered with an optical solar reflector (OSR) type of coating.

The invention will be better understood by reading the following description, given solely as an example and with reference to the drawings, in which:

FIG. 5 is a schematic perspective view of the spacecraft illustrated in FIG. 3, at the time of the summer solstice;

Figure 2:
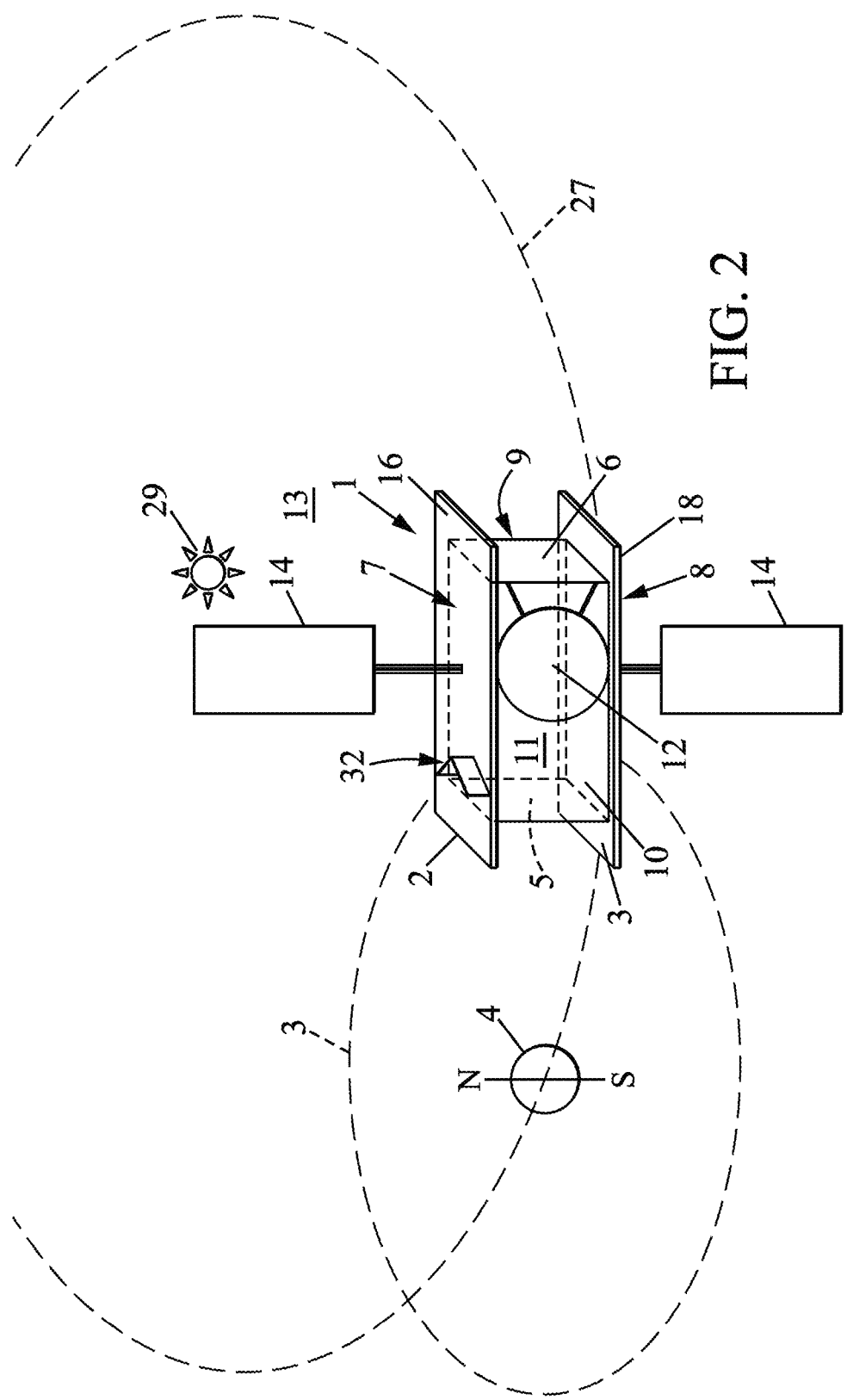
FIG. 2 is a schematic view of a spacecraft according to the invention in geostationary orbit, the spacecraft having auxiliary radiators according to a first embodiment.

With reference to FIG. 2, a spacecraft 1 is able to travel in an orbit 3 around the Earth 4, the Earth 4 itself traveling in an orbit 27 around the sun 29.

The spacecraft 1, which is a geostationary satellite, is in the form of a parallelepipedal housing 2 defining an interior space 11 and an exterior space 13. This housing 2 always has the same face directed towards the Earth, that face being called the Earth face 5. The face opposite and parallel to the Earth face 5 is called the anti-Earth or zenith face 6.

Face −X, also called the east face 9, and face +X, also called the west face 10, are opposite sides that are parallel to each other and perpendicular to the direction of movement of the spacecraft 1. Communication antennas 12 are generally fixed to the −X 9 and +X 10 faces.

Face −Y, also called the north face 7, and face +Y, also called the south face 8, are two other faces of the housing. They are opposite and parallel to one another and perpendicular to the north-south axis of the Earth 4.

Solar panels 14 are fixed on the north 7 and south 8 faces. Finally, a first main radiator 16, generally called the north radiator, is fixed to and extends over the north face 7. A second main radiator 18, generally called the south radiator, is fixed to and extends over the south face 8.

Figure 3:
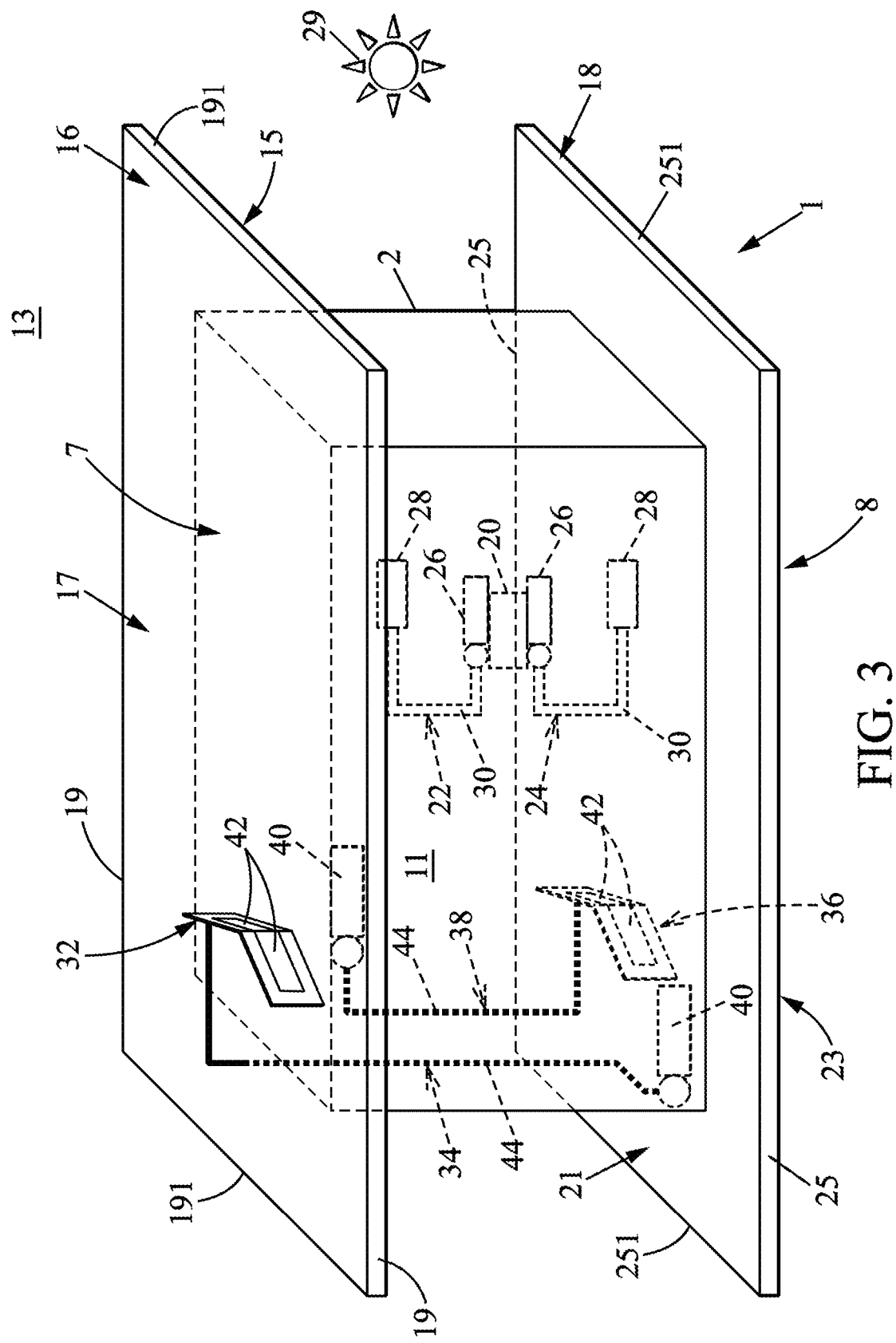
FIG. 3 is a schematic perspective view of the spacecraft illustrated in FIG. 2, without solar panels and during the equinox.

With reference to FIG. 3, the first 16 and the second 18 radiators have a general parallelepipedal shape. They each have two longitudinal side faces 19, 25 and two transverse side faces 191, 251, an inner main face 15, 21 fixed to the housing 2, and an outer main face 17, 23 opposite to the inner main face and located on the side of the housing facing the exterior space 13.

The spacecraft 1 carries electronic equipment 20 as well as first 22 and second 24 main heat transfer devices suitable for cooling the electronic equipment 20. The electronic equipment conventionally comprises radio frequency equipment, electronic equipment, measurement instruments, calculation units, and batteries. The first main heat transfer device 22 thermally connects the electronic equipment 20 to the first radiator 16. The second main heat transfer device 24 thermally connects the electronic equipment 20 to the second radiator 18.

In a conventional manner, the first 22 and second 24 main heat transfer devices each comprise an evaporator 26 in thermal contact with electronic equipment 20, a condenser 28 in thermal contact with the first radiator 16 and the second radiator 18 respectively, and pipes 30 for conveying a heat transfer fluid, connecting the evaporator 26 to the condenser 28. By convention, the evaporators are indicated in the figures by a combined circle and rectangle and the condensers by a rectangle. These main heat transfer devices 22 and 24 may be conventional heat pipes or capillary loops in which the reservoir of fluid is integrated into the evaporator (Loop Heat Pipe).

According to the invention, the spacecraft 1 further comprises a first auxiliary radiator 32 fixed to the first radiator 16, a first auxiliary heat transfer device 34 able to transfer heat from the first auxiliary radiator 32 to the inner*** face 21 of the second radiator, a second auxiliary radiator 36 fixed to the second radiator 18, and a second auxiliary heat transfer device 38 able to transfer heat from the second auxiliary radiator 36 to the inner face 5 of the first radiator.

The first 34 and second 38 auxiliary heat transfer devices are identical. They are non-reversible, meaning that they are unidirectional. They each comprise an evaporator 40, a condenser assembly 42, and pipes 44 thermally connecting the evaporator 40 to the condenser assembly 42.

Preferably, it will be a capillary driven loop (CDL) and in particular a capillary loop in which the fluid reservoir is integrated into the evaporator (Loop Heat Pipe). These devices are well-known to those skilled in the art. One can refer in particular to the ECSS-E-ST-31-02C standard of Dec. 12, 2012.

The evaporator 40 of the first auxiliary heat transfer device is in thermal contact with the inner main face 21 of the second radiator 18. The evaporator 40 of the second auxiliary heat transfer device is in its thermal contact with the inner main face 15 of the first radiator. The condenser assembly 42 of the first auxiliary heat transfer device is in thermal contact with the first auxiliary radiator 32. The condenser assembly 42 of the second auxiliary heat transfer device is in thermal contact with the second auxiliary radiator 36.

Figure 4:
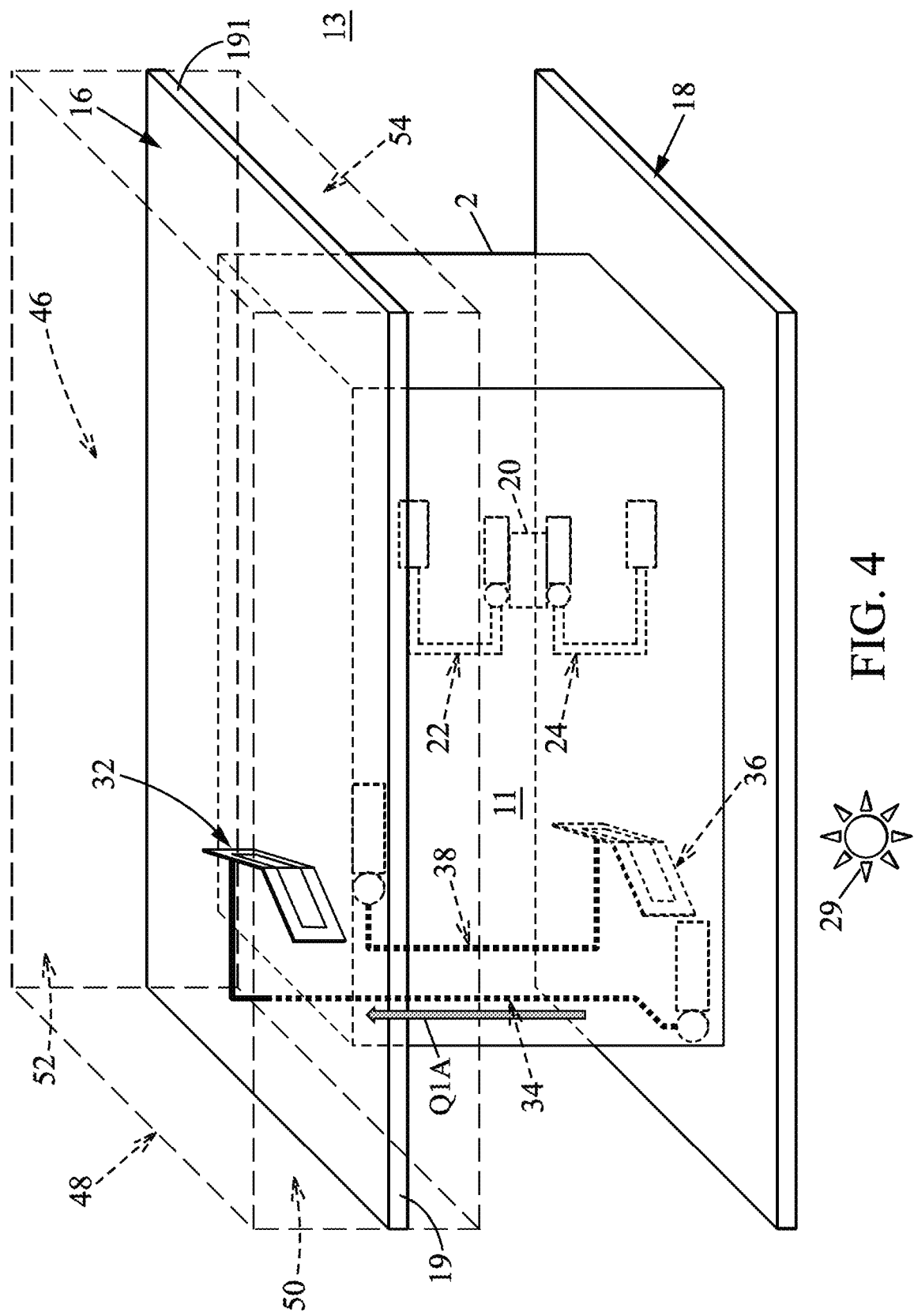
FIG. 4 is a schematic perspective view of the spacecraft illustrated in FIG. 3, at the time of the winter solstice.

The first auxiliary radiator 32 and the first auxiliary heat transfer device 34 enable cooling the second radiator 18 when it is exposed to solar radiation, in other words during the winter solstice (WS), Indeed, as shown in FIG. 4, during the winter solstice the second radiator 18 is exposed to solar radiation while the first auxiliary radiator 32 is in the shadow of the satellite housing. The difference in temperature between the second radiator 18 and the first auxiliary radiator 32 causes a portion Q1A of the heat to be transferred from the second radiator 18 to the first auxiliary radiator 32 via the first auxiliary heat transfer device 34. This portion Q1A of the heat is released to the exterior space 13 by the first auxiliary radiator 32.

Figure 6:
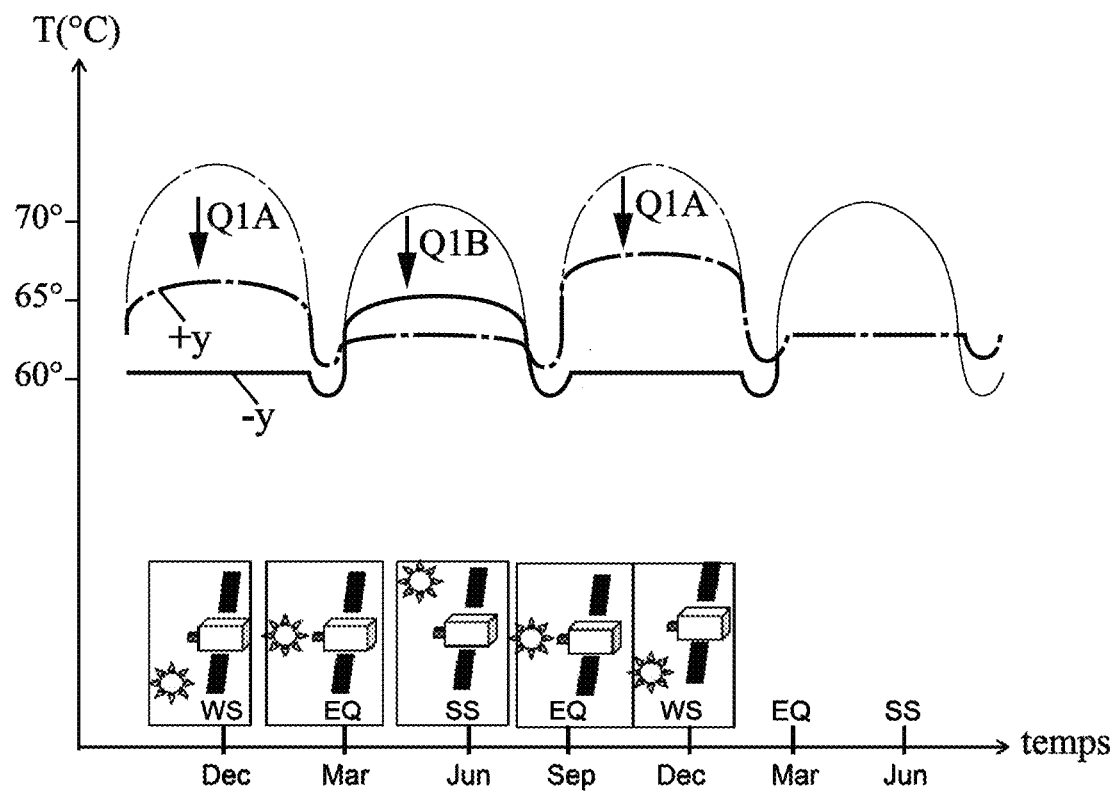
FIG. 6 shows two curves representative of the temperature variations of the +Y and −Y faces of the spacecraft illustrated in FIG. 2, over the course of a year.

As a result, as can be seen in FIG. 6, the temperature of the south face 8 (+Y face) decreases during the winter solstice, reducing the temperature difference between the north 7 and south 8 faces.

In the same manner, the second auxiliary radiator 36 and the second auxiliary heat transfer device 38 enable cooling the first radiator 16 when it is exposed to solar radiation, in other words during the summer solstice (SS). As can be seen in FIG. 5, during the summer solstice the first radiator 16 is exposed to solar radiation while the second auxiliary radiator 36 is in the shadow of the satellite housing. The difference in temperature between the first radiator 16 and the second auxiliary radiator 36 causes the transfer of a portion Q1B of the heat from the first radiator 16 to the second auxiliary radiator 36 via the second auxiliary heat transfer device 38. This portion Q1B of the heat is released by the second auxiliary radiator 36 which is located on the shaded side during the summer solstice.

Thus, as can be seen in FIG. 6, the temperature of the north face 7 (face −Y) decreases during the summer solstice, reducing the temperature difference between the north 7 and south 8 faces.

Figure 7:
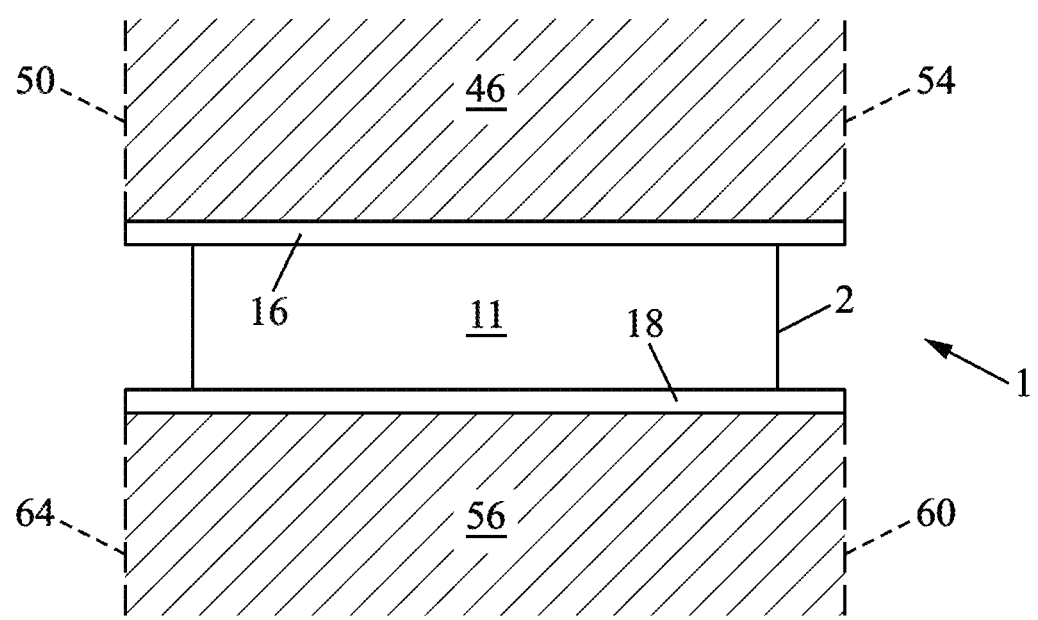
FIG. 7 is a simplified front view of the spacecraft illustrated in FIGS. 2 to 5.

In order to permit this heat transfer, the first 32 and second 36 auxiliary radiators are each respectively arranged in the shadow of the first radiator and second radiator during a solstice. Thus, the first auxiliary radiator 32 is arranged in the extension of the first radiator 16, in a direction perpendicular to the north face 7 of the first radiator 16. It extends into a first portion 46 of the exterior space 13 which is shaded during the winter solstice. This first portion 46 is defined by the outer main face 17 of the first radiator and by four planes 48, 50, 52, 54 each containing a side face 19 of the first radiator, as is schematically shown in FIGS. 4 and 7.

In the same manner, the second auxiliary radiator 36 is arranged in the extension of the second radiator 18, in a direction perpendicular to the south face +Y of the second radiator 18. It extends into a second portion 56 of the exterior space 13 which is shaded during the summer solstice. This second portion 56 is defined by the outer main face 23 of the second radiator and by four planes 58, 60, 62, 64 each containing a side face 25 of the second radiator, as is schematically shown in FIGS. 5 and 7.

The first 32 and second 36 auxiliary radiators are, for example, arranged above the solar panels 14 when these panels are folded into the launch configuration. They have a small dimension in the direction normal to the first 7 and second 8 faces, because they must be able to be housed within the space under the launcher nosecone.

The first 32 and second 36 auxiliary radiators are preferably thermally insulated from the first 16 and second 18 radiators that support them. This thermal insulation is, for example, achieved by placing plastic washers in the mounting feet that attach the auxiliary radiators 32, 36 to the main radiators 16, 18.

Figure 1:
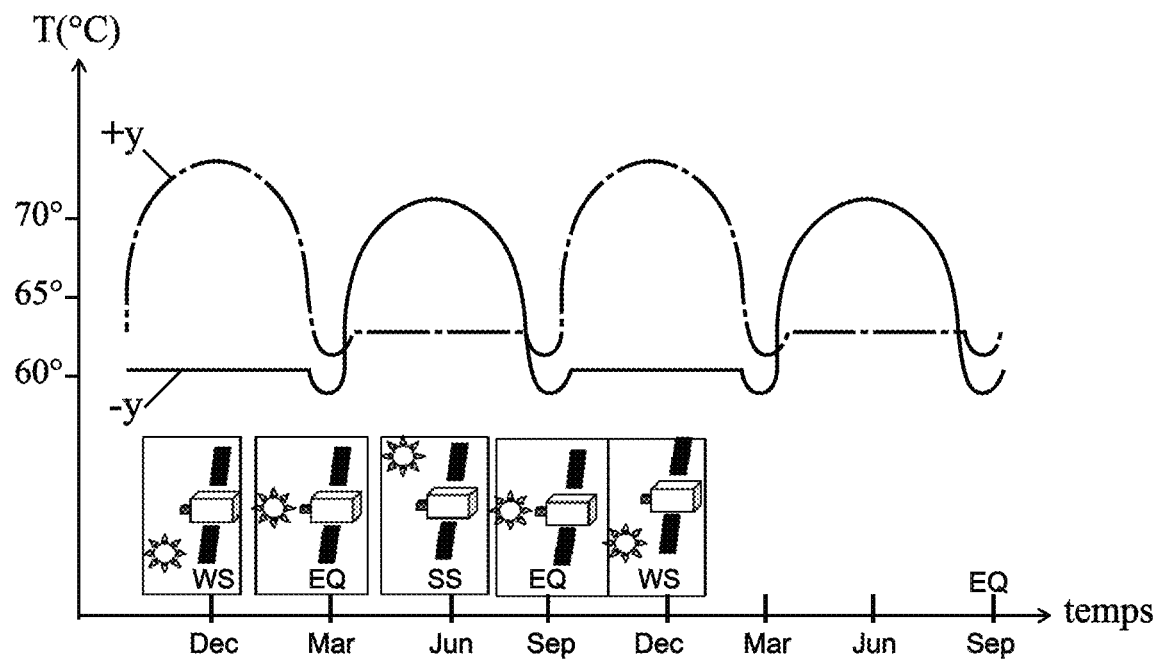
FIG. 1 shows two curves representative of the temperature variations of the +Y and −Y faces of a spacecraft according to the prior art, over the course of a year.

Advantageously, this thermal insulation makes it possible to considerably increase the efficiency of the auxiliary radiators 32, 36. Indeed, as can be seen in FIG. 1, even when they are in the shade the first radiator 16 and second radiator 18 present a temperature of around 60° C. As the auxiliary radiators 32, 36 are insulated from the main radiators 16, 18, they have a much lower temperature than the temperature of the radiator fixed on the opposite face of the housing 2, so that they are able to absorb a large amount of heat from this radiator in an efficient manner. Thus, despite their small size, they can be efficient in removing the heat received.

Figure 8:
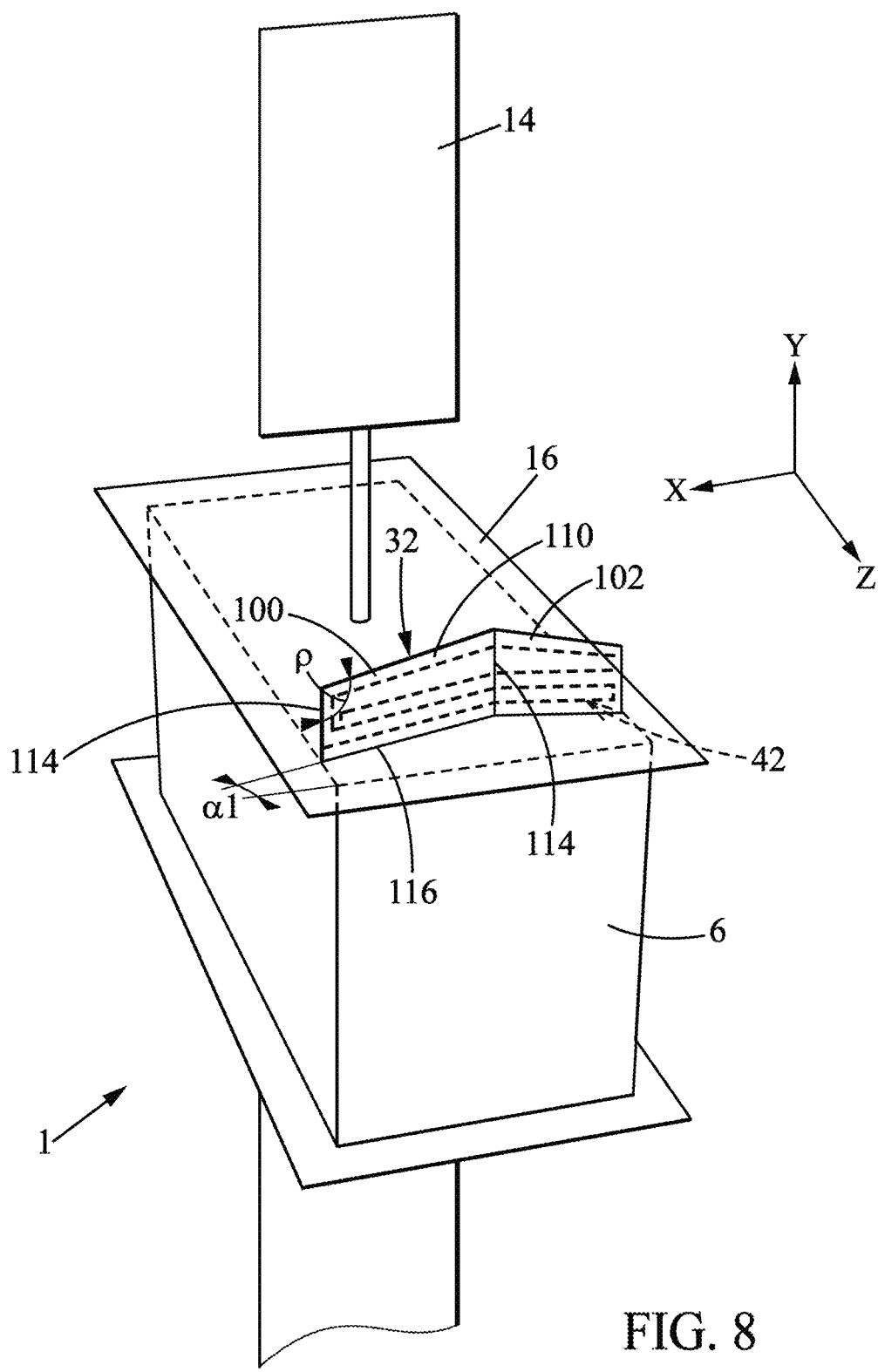
FIG. 8 is a schematic perspective view of the spacecraft illustrated in FIGS. 2 to 5 and 7.

With reference to FIG. 8, the first auxiliary radiator 32 according to the first embodiment is composed solely of a first radiating panel 100 supporting a part of the condenser assembly 42 and a second radiating panel 102 supporting the other part of the condenser assembly 42. As these two radiating panels carry the condenser assembly 42, they are hereinafter referred to as the first 100 and second 102 carrier radiating panels.

The first carrier radiating panel 100 has a first main face 110, a second main face 112 opposite to the first main face, two side edges 114, and two longitudinal edges 116. It is advantageously implemented in a honeycomb structure.

Figure 9:
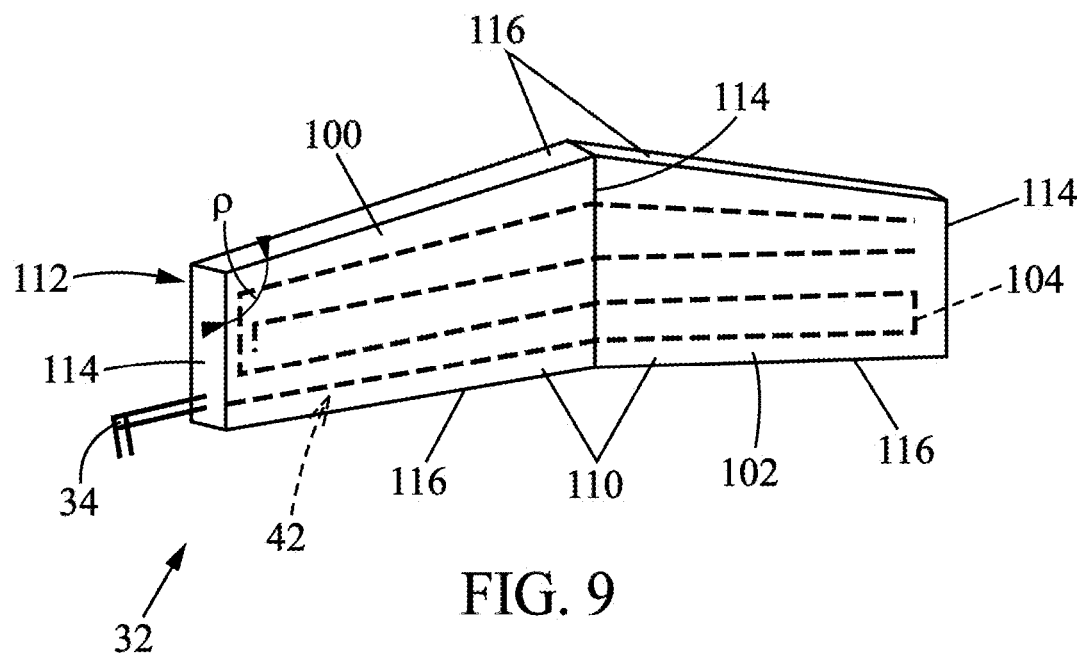
FIG. 9 is a schematic perspective view of the first auxiliary radiator of the spacecraft illustrated in FIGS. 2 to 5, 7 and 8.

The second carrier radiating panel 102 is similar to the first carrier radiating panel 100 and will not be described in detail. Referring to FIG. 9, the condenser assembly 42 is for example composed of a condenser tube 104 which extends over the surface of the first 100 and the second 102 carrier panels. In the example shown, the condenser tube 104 is arranged to form a serpentine pattern having four longitudinal arms. This condenser tube 104 is traveled by the heat transfer fluid of the first auxiliary heat transfer device 34.

In the example shown, the condenser tube 104 is integrated into the carrier radiating panels. Alternatively, it may be arranged on one of the main faces of the carrier radiating panels.

Figure 10:
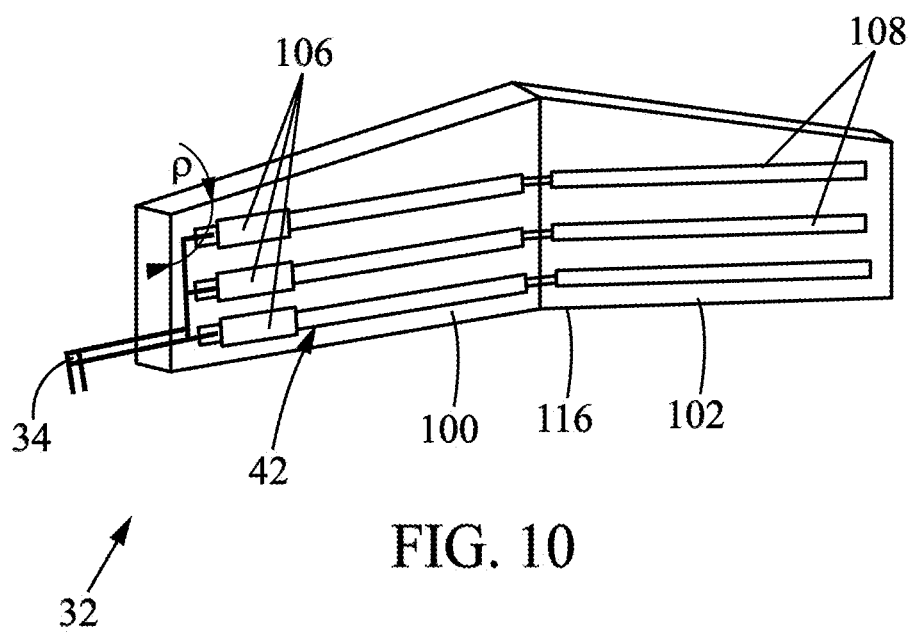
FIG. 10 is a schematic perspective view of a variant of the first auxiliary radiator.

According to a variant illustrated in FIG. 10, the condenser assembly 42 comprises three condensers 106 fluidly connected to the first auxiliary heat transfer device 34, and three heat pipes 108 each in a heat exchange with a condenser 106. The three condensers 106 are arranged adjacent to one another along the free lateral side of the first carrier radiating panel 100. Each heat pipe 108 extends over the first 100 and second 102 carrier radiating panels in a direction parallel to the longitudinal sides 116 of the carrier radiating panels.

In the example shown, the condensers 106 and heat pipes 108 are arranged on one of the main faces of the radiating panel. Alternatively, they may be integrated therein.

Alternatively, the heat transfer devices 34, 38 are reversible. In this case, the condenser assemblies 42 are replaced by heat exchanger assemblies, as described in detail hereinafter with reference to FIGS. 20 to 22. The condenser assemblies 42 and the heat exchanger assemblies are designated by the general term "heat conducting devices" in the claims.

With reference to FIG. 8, the first 100 and second carrier radiating panels extend perpendicularly to the first radiator 16.

The midplane of the first carrier radiating panel 100 is at a first angle $\alpha 1$ relative to the midplane of the zenith face 6. The first angle $\alpha 1$ is between 10° and 35°.

The midplane of the second carrier radiating panel is at a second angle $\alpha 2$ relative to the midplane of the zenith face 6. In the example shown, the second angle $\alpha 2$ is equal to $-\alpha 1$.

Alternatively, the first angle $\alpha 1$ may be different from the second angle $\alpha 2$.

Preferably, the first angle $\alpha 1$ and the second angle $\alpha 2$ are between 15° and 30°.

Figure 11:
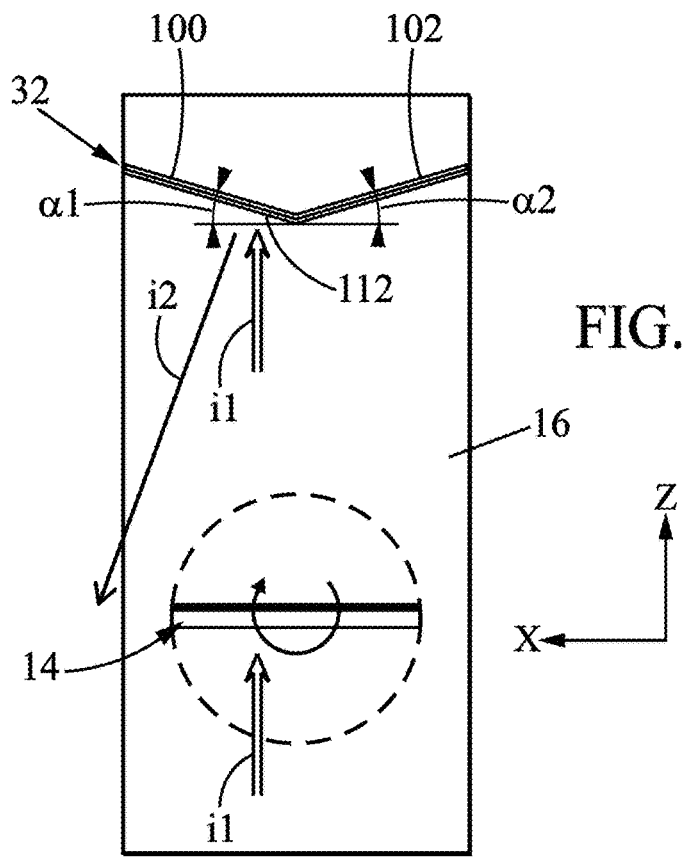
FIG. 11 is a front view of the north face of the spacecraft illustrated in FIG. 2, at 12 noon local time.

As illustrated in FIG. 11, the inclination of the carrier radiating panels 100 102 relative to the zenith face 6 advantageously makes it possible to reflect the incident solar radiation i1 away from the rear face of the solar panel 14, when this solar radiation is oriented in the direction +Z, meaning at 12 o'clock (noon) local time. Thus, the face of the auxiliary radiator located on the solar panel 14 side, referred to as the second main face 112, reflects the solar radiation i2 away from the solar panel. The auxiliary radiator 32 according to this embodiment thus makes it possible to avoid overheating and a deterioration of the solar panel 14 resulting from this overheating.

To improve this reflection, the carrier radiating panels 100, 102 are preferably coated with a specific coating of several types. The choice of coating results from a compromise between cost and performance.

Thus, a standard optical solar reflector type of coating (generally referred to as OSR) may be used on the first main faces 110 (+Z) and the second main faces 112 (−Z). Such a coating is used in most cases, because it is the most efficient.

Alternatively, a white paint type of coating may be used on the first main faces 110 (+Z) and the second main faces 112 (−Z) because it is less expensive, but also less effective.

Another variant would be to combine both an OSR coating and a white paint coating. Thus, an OSR coating could be used on the first main face 110 (+Z) and a white paint coating on the second main face 112 (−Z) to allow diffuse solar reflection towards the satellite appendages. This variant offers a good compromise between cost and performance.

Figure 12:
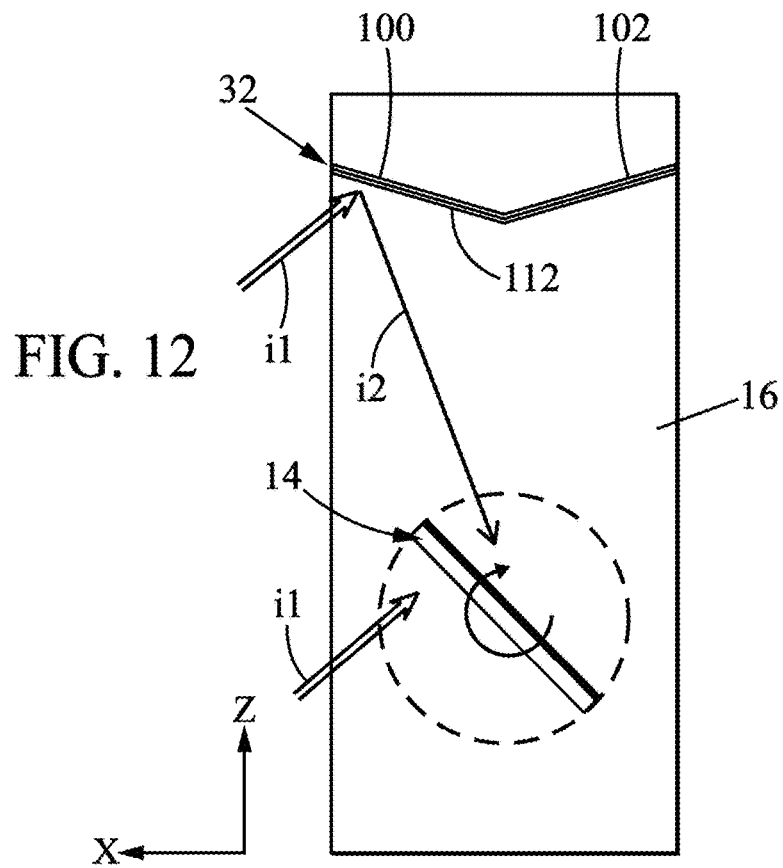
FIG. 12 is a front view of the north face of the spacecraft illustrated in FIG. 2, at 9 a.m. or at 3 p.m. local time.

At 9 a.m. or 3 p.m. local time, the incident solar radiation i1 is oriented in an X-Z direction shown in FIG. 12. At that time, the solar radiation i2 reflected by the first auxiliary radiator 32 reaches the rear face of the solar panel 14, as shown in FIG. 12. However, at that hour, the solar radiation i2 has a weakened intensity resulting from the low angular incidence on the solar panel 14, such that it does not damage the solar panel 14.

Figure 13:
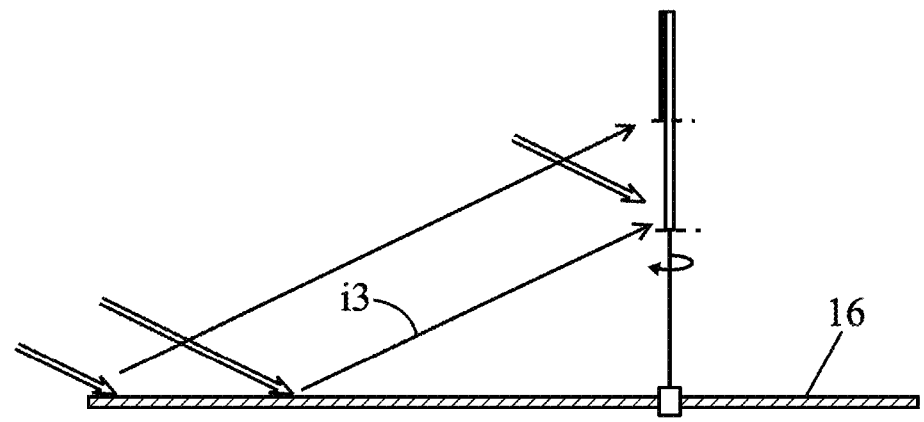
FIG. 13 is a front view along the +X direction, of the first radiator and the solar panel of the spacecraft according to the prior art at midnight local time.
Figure 14:
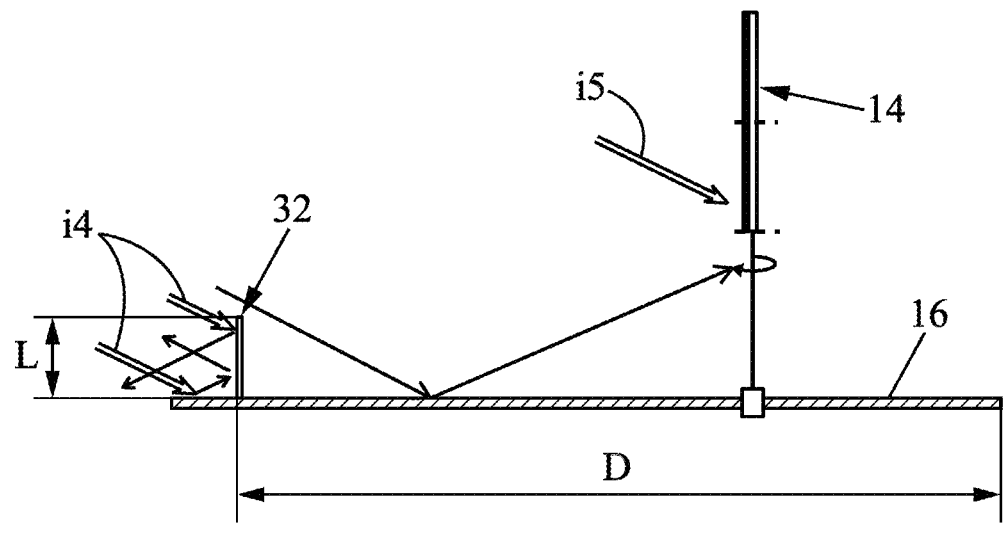
FIG. 14 is a front view along the +X direction of the first radiator, first auxiliary radiator, and solar panel of the spacecraft illustrated in FIG. 2, at midnight local time.

Preferably, with reference to FIGS. 13 and 14, the first 100 and second 102 carrier radiating panels have a width L comprised between 100 and 600 millimeters and the carrier radiating panels 100, 102 are fixed to the first radiator 16 at a distance D comprised between 1 meter and 5.2 meters from the plane containing the zenith face 6. This distance D is measured along a line perpendicular to the plane containing the zenith face 6.

Preferably, this width L is between 400 millimeters and 500 millimeters.

Preferably, this distance D is between 4.3 meters and 5 meters.

Without loss of generality, the invention is also adapted to function on satellites of smaller size, in GEO orbit or other orbits such as LEO or HEO. In these cases, the dimensions of the carrier radiating panels and their location on the radiators are adapted in order to maintain the same functions as described above.

Advantageously, this width L of the carrier radiating panels 100, 102 and this positioning of the first auxiliary radiator 32 at distance D make it possible to prevent the light rays i3 reflected by the first auxiliary radiator 32 from reaching the lower portion of the solar panel 14. In the absence of a first auxiliary radiator 32, when the solar radiation is oriented in the −Z direction, the first radiator 16 reflects the incident solar radiation i3 towards the lower portion of the solar panel as can be seen in FIG. 13. The light intensity reaching the photovoltaic cells of the solar panel 14 corresponds to the light intensity of the direct solar radiation and to the light intensity of the reflected solar radiation. This light intensity is significant and damages the photovoltaic cells of the solar panel 14 such that, in general, in current satellites the lower portion of the solar panel 14 is not equipped with photovoltaic cells, resulting in a loss of electric power for the payload.

Advantageously, according to the invention, when a first auxiliary radiator 32 having a width L and a position defined by the distance D is fixed on the first radiator 16 as illustrated in FIG. 14, the incident solar radiation i4 directed in direction −Z reaches the first auxiliary radiator 32. It is not reflected towards the solar panel 14. The lower portion of the solar panel 14 only receives the direct solar radiation i5. The light intensity of the direct solar radiation can be tolerated by the photovoltaic cells. Thus, when a first auxiliary radiator 32 having a width L and a position as defined above is fixed on the first radiator 16, the lower portion of the solar panel 14 may advantageously comprise photovoltaic cells. There is a resulting gain in electrical energy produced for the satellite.

Referring to FIG. 8, a longitudinal edge 116 of the carrier radiating panels 100, 102 is fixed to the first radiator 16. A side edge 114 of the first carrier radiating panel is fixed to a side edge 114 of the second carrier radiating panel such that the two panels form a V or a triangle when viewed along the Y axis. The V formed by the two carrier radiating panels 100, 102 points towards the solar panel 14.

In the embodiment shown, the main face 110 of the first and second carrier radiating panels has the shape of a rectangular trapezoid. This shape advantageously allows a large radiation surface area by making the most of the circular space available under the nosecone, while being simple to implement.

For example, one side edge 114 of the carrier radiating panels measures 400 millimeters and the other edge 114 of the carrier radiating panels measures 500 millimeters.

The longitudinal edges 116 of the first carrier radiating panel measure for example 1,150 millimeters. In the embodiment shown, the longitudinal edges 116 of the second carrier radiating panel measure 700 millimeters.

The side edge 114 of each carrier radiating panel fixed to the side edge 114 of the other carrier radiating panel is the side edge having the largest dimension. Thus, the first auxiliary radiator 32 has an inverted V shape when the first radiator is viewed along the Z axis illustrated in FIG. 8.

The carrier radiating panel of rectangular trapezoidal shape presents an obtuse angle (ρ) adjacent to the longitudinal side face 19 of the first radiator.

Alternatively, a different number of condensers is mounted on the carrier radiating panels.

Alternatively, the first angle α1 or the second angle α2 is zero. In this case, the midplane of the first or second carrier radiating panel is parallel to the zenith face 6.

Alternatively, the first and the second angles α1, α2 are defined with respect to the Earth face.

According to a variant that is not shown, the first auxiliary radiator 32 is composed of a single radiating panel 100 which extends perpendicularly to the first radiator and which is at an angle comprised between 10° and 35° relative to the zenith face 6.

Alternatively, the main faces 110, 112 of the carrier radiating panels have the shape of a rectangle.

Alternatively, the first auxiliary radiator has a single carrier radiating panel in the form of a rectangular trapezium whose obtuse angle (ρ) is adjacent to the longitudinal side face 19 of the first radiator.

FIGS. 15 to 19 show different embodiments of the first auxiliary radiator. These different embodiments comprise elements that are identical or similar to the elements of the first auxiliary radiator according to the first embodiment of the invention. These identical or similar elements bear the same references as in the description of the first auxiliary radiator according to the first embodiment, and will not be described again. Only the features specific to each of these embodiments are described below.

Figure 15:
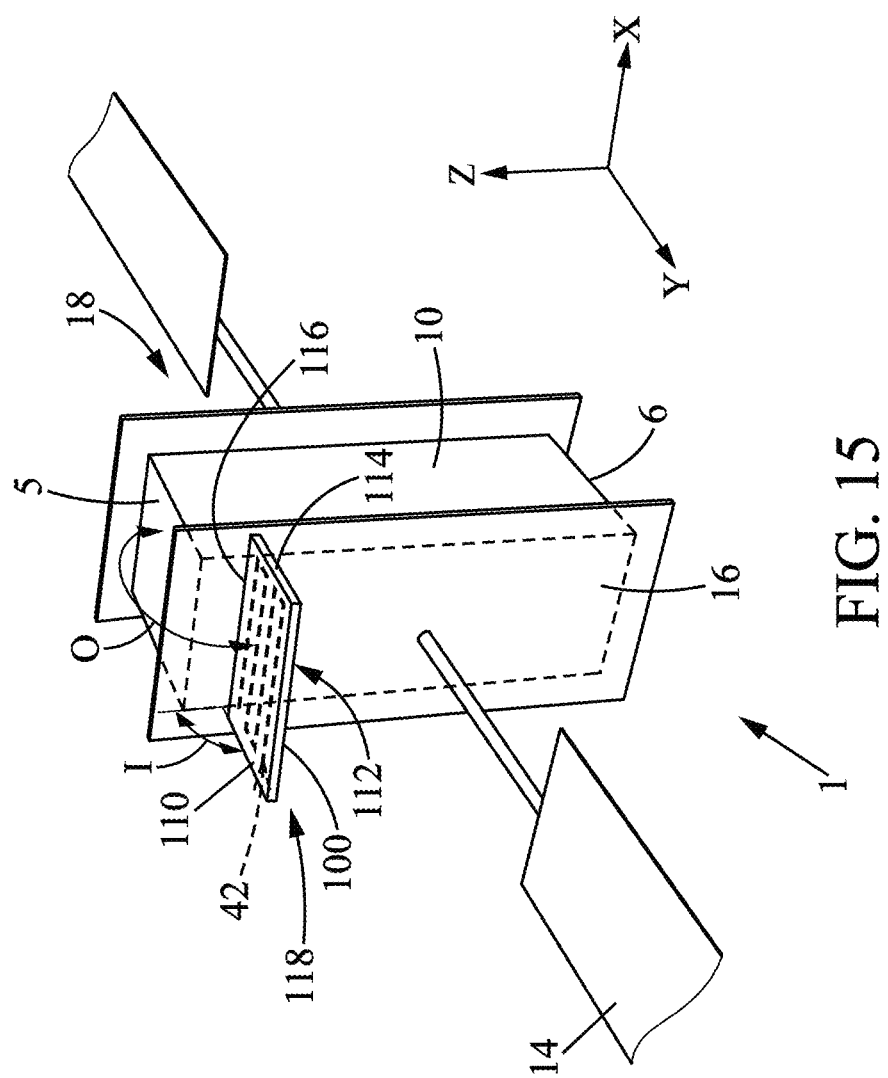
FIG. 15 is a perspective view of a spacecraft according to the invention comprising an auxiliary radiator according to a second embodiment.

A first auxiliary radiator 118 according to a second embodiment of the invention is illustrated in FIG. 15. The first auxiliary radiator 118 according to this second embodiment is composed of a single radiating panel 100 supporting a condenser assembly 42, called the carrier radiating panel.

The carrier radiating panel 100 of the auxiliary radiator 118 according to this second embodiment has a first main face 110 oriented in the +Z direction, a second main face 112 opposite to the first main face, two side edges 114, and two longitudinal edges 116. It may be implemented in a honeycomb structure and coated with a solar optical reflective or white paint coating. In the embodiment shown, it has a rectangular shape.

The condenser assembly 42 carried by the carrier radiating panel is similar to the condenser assembly 42 described for the first auxiliary radiator 32 and will not be described again.

In the embodiment represented, the carrier radiating panel 100 is fixed to the first radiator 16 so that the midplane of the carrier radiating panel is parallel to the plane containing the zenith face 5. The angle I=(Y, Z) relative to the (X, Y, Z) reference system represented in FIG. 15 is equal to 90°. The angle O=(X, Z) relative to the (X, Y, Z) reference system represented in FIG. 15 is equal to 0°.

Alternatively, the carrier radiating panel 100 is fixed to the first radiator 16 so as to have an angle of inclination O relative to the plane containing the zenith face 5 and/or so as to have an angle of inclination that is not 90° relative to the first radiator 16.

Figure 16:
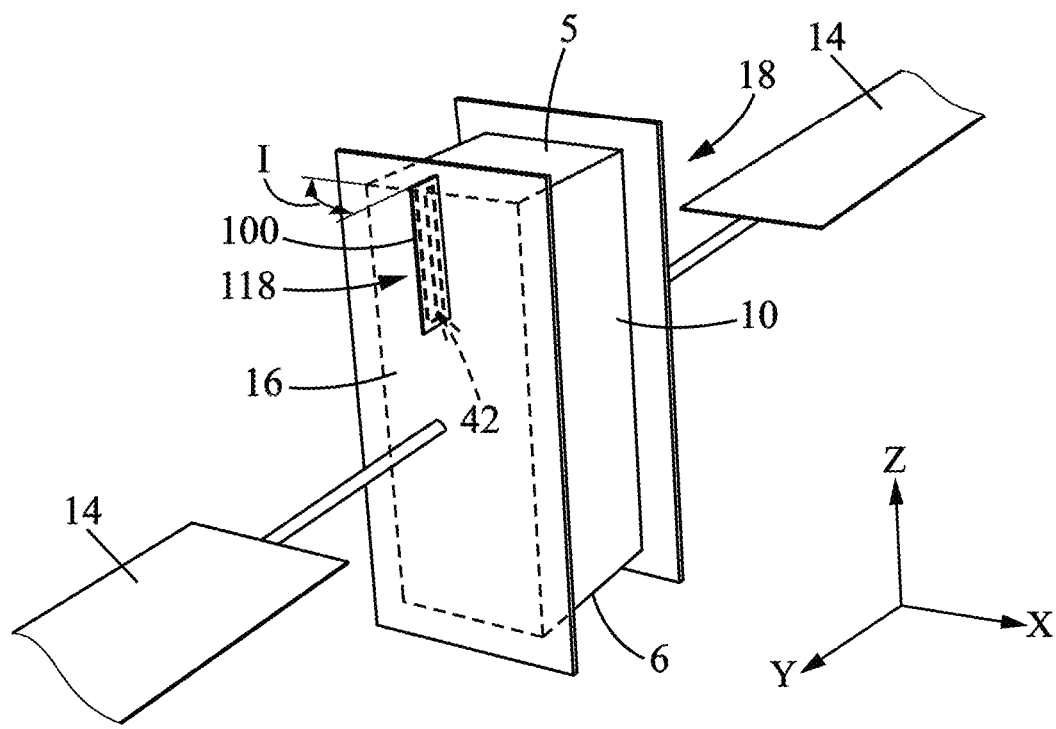
FIG. 16 is a perspective view of a spacecraft according to the invention comprising an auxiliary radiator according to a variant of the second embodiment.

For example, in FIG. 16, the first auxiliary radiator 118 according to the second embodiment is fixed to the first radiator 16 so as to extend perpendicularly to the first radiator 16 and perpendicularly to the zenith face 5. In this case the angles of inclination O and I are equal to 90°.

Figure 17:
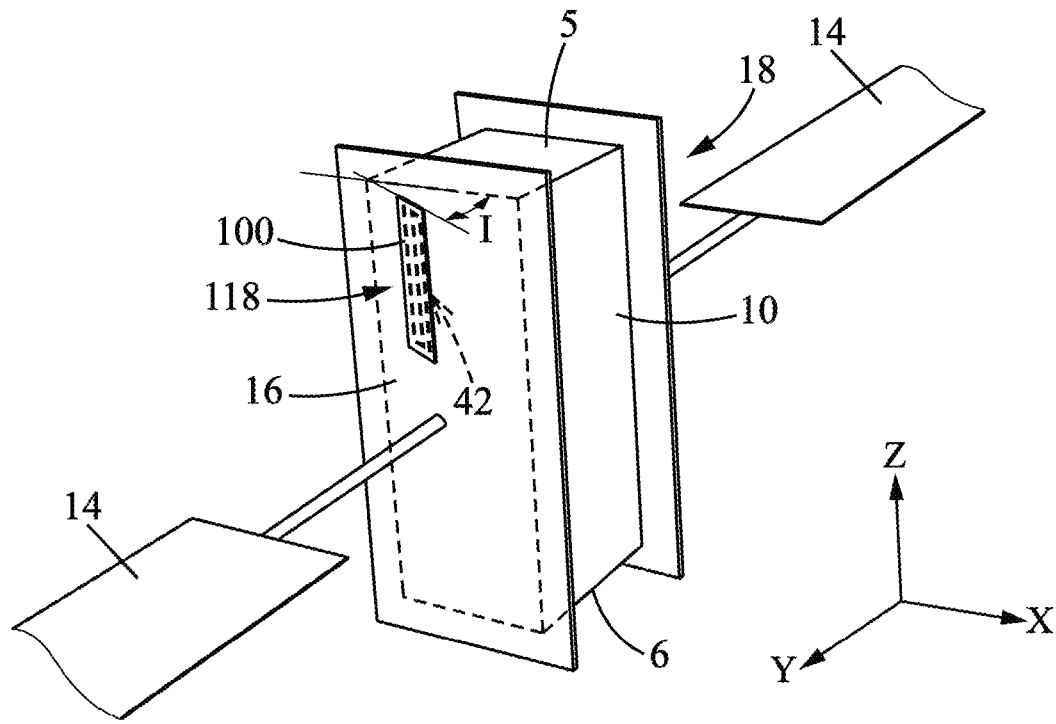
FIG. 17 is a perspective view of a spacecraft according to the invention comprising an auxiliary radiator according to another variant of the second embodiment.

According to another example illustrated in FIG. 17, the first auxiliary radiator 118 according to the second embodiment is fixed to the first radiator 16 so that angle of inclination O is equal to 90° and angle of inclination I is equal to 23.5°.

Advantageously, this embodiment is simpler to implement.

Figure 18:
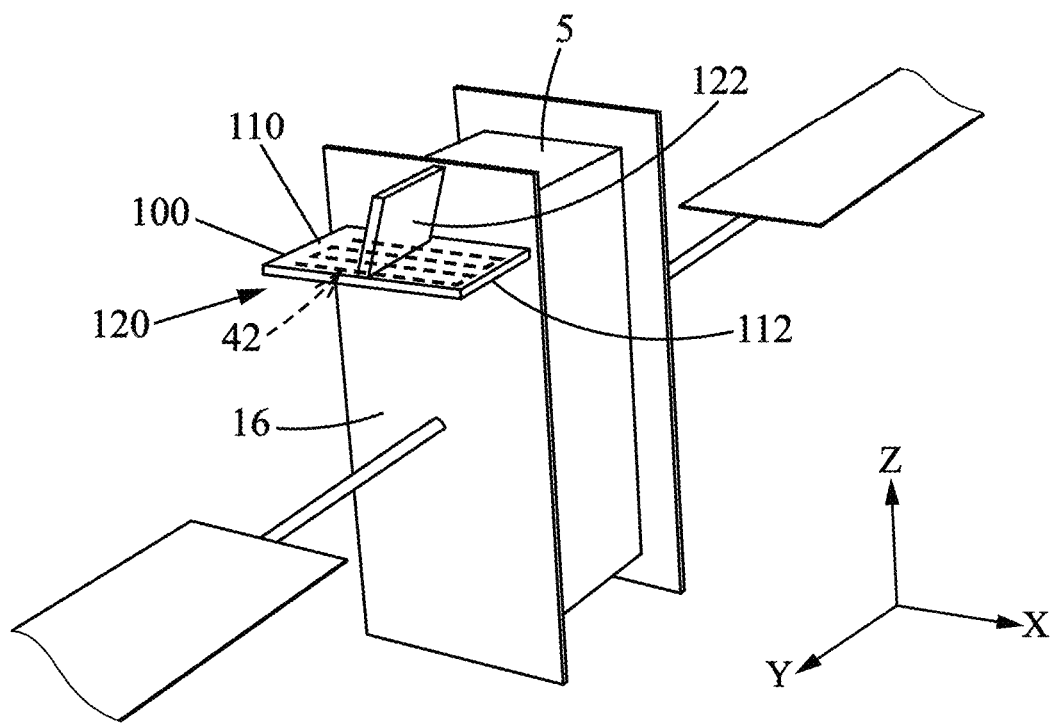
FIG. 18 is a perspective view of a spacecraft according to the invention comprising an auxiliary radiator according to a third embodiment.

A first auxiliary radiator 120 according to a third embodiment of the invention is illustrated in FIG. 18. The first auxiliary radiator 120 according to this third embodiment is composed of a single radiating panel 100 supporting a condenser assembly 42, called a carrier radiating panel, and a radiating panel without any condenser assembly, called a non-carrier radiating panel 122.

The carrier radiating panel 100 and the condenser assembly 42 of the auxiliary radiator according to this third embodiment are respectively identical to the carrier radiating panel 100 and the condenser assembly 42 of the auxiliary radiator according to the second embodiment and will not be described again.

Preferably, the condenser assembly 42 is attached to the second main face 112 or is integrated into the panel.

The carrier radiating panel 100 of the auxiliary radiator has a rectangular shape.

It is fixed to the first radiator 16 so as to extend perpendicularly thereto and perpendicularly to the zenith face 6.

The non-carrier radiating panel 122 is fixed to the first main face 110 so as to extend perpendicularly to the carrier radiating panel 100 and to the first radiator 16. The first auxiliary radiator 120 has the shape of a T, the central stem of this T oriented in direction +Z.

Alternatively, the non-carrier radiating panel 122 may have an angle different from 90° relative to the carrier radiating panel.

Alternatively, the non-carrier radiating panel 122 may be off-centered relative to the middle of the carrier radiating panel, thus forming a T with a central stem that is more or less off-center.

Figure 19:
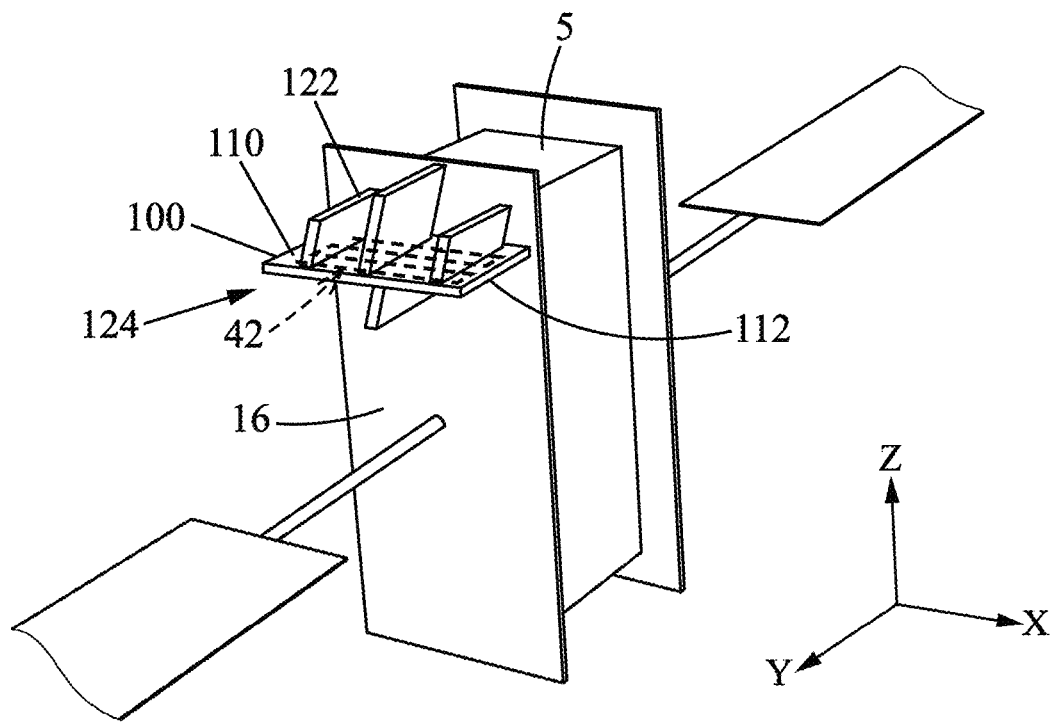
FIG. 19 is a perspective view of a spacecraft according to the invention comprising an auxiliary radiator according to a fourth embodiment.

A first auxiliary radiator 124 according to a fourth embodiment of the invention is illustrated in FIG. 19. The first auxiliary radiator 124 according to this fourth embodiment is composed of a single radiating panel 100 supporting a condenser assembly 42, called a carrier radiating panel, and several radiating panels 122 without any condenser assembly, called non-carrier radiating panels.

The carrier radiating panel 100 and the condenser assembly 42 of the first auxiliary radiator according to this fourth embodiment are respectively identical to the carrier radiating panel 100 and the condenser assembly 42 of the auxiliary radiator 118 according to the second embodiment and will not be not described again.

In this embodiment, the condenser assembly 42 is integrated into the panel.

The non-carrier radiating panels 122 have a rectangular shape. They have different widths. In the example shown, three non-carrier radiating panels are fixed to the first main face 110 and one non-carrier radiating panel is fixed to the second main face 112 of the carrier radiating panel.

Alternatively, a different number of non-carrier radiating panels are fixed to each face of the carrier radiating panel.

In the embodiment shown, the non-carrier radiating panels 122 extend perpendicularly to the first radiator 16 and perpendicularly to the carrier radiating panel 100. Alternatively, they may be at a different angle than 90° relative to the carrier radiating panel 100.

Preferably, the non-carrier radiating panels 122 of greater width are arranged in a central portion of the carrier radiating panel 100.

According to a variant not shown, the first auxiliary radiator has the general shape of an M or W. It comprises two carrier radiating panels 100 fixed to each other at the edges to form a V, and two radiating panels without any heat conducting device 122. Each non-carrier radiating panel is fixed to the free edge of each carrier radiating panel so as to form a V.

The non-carrier radiating panels serve as thermal fins, the fins acting by conduction. They are preferably made of aluminum or of a flexible material such as grafoil or pyrolytic graphite such as HiPeR.

Similarly to the first auxiliary radiator 32 according to the first embodiment, the first auxiliary radiators according to the second, third, and fourth embodiments have a width L of between 400 and 500 millimeters and they are fixed to the first radiator 16 at a distance comprised between 1 meter and 5.2 meters, and preferably between 4.3 meters and 5 meters, from the plane containing the zenith face 6. Thus, the first auxiliary radiator according to these second, third, and fourth embodiments allows preventing solar radiation oriented in the −Z direction from reaching the lower portion of the solar panel.

The second auxiliary radiator 36 is identical to the first auxiliary radiator 32 and will not be described in detail.

Figure 20:
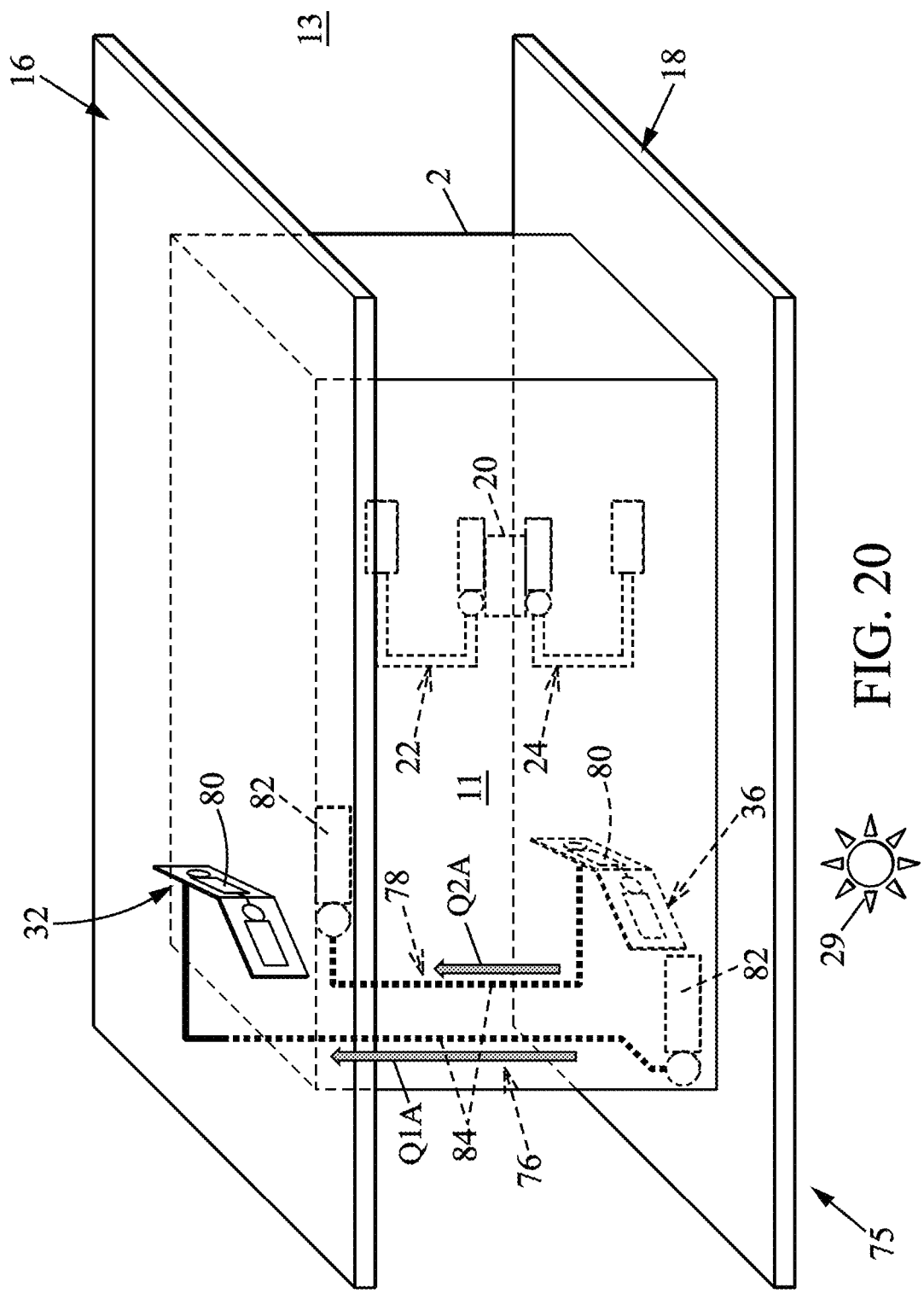
FIG. 20 is a schematic perspective view of a variant of the spacecraft according to the invention, without solar panels and during the winter solstice, the spacecraft comprising auxiliary radiators according to the first embodiment.
Figure 21:
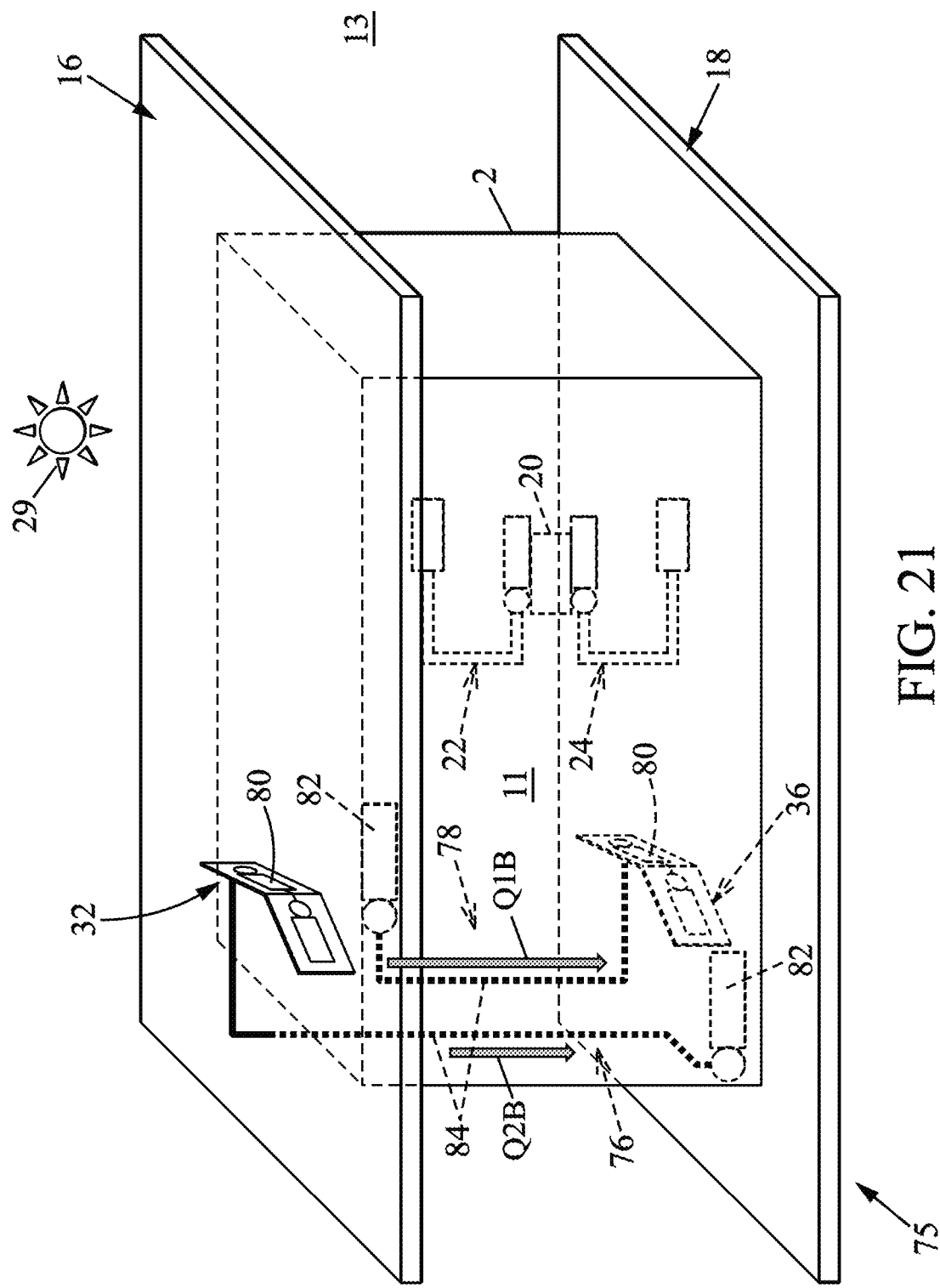
FIG. 21 is a schematic perspective view of the spacecraft illustrated in FIG. 20, during the summer solstice.
Figure 22:
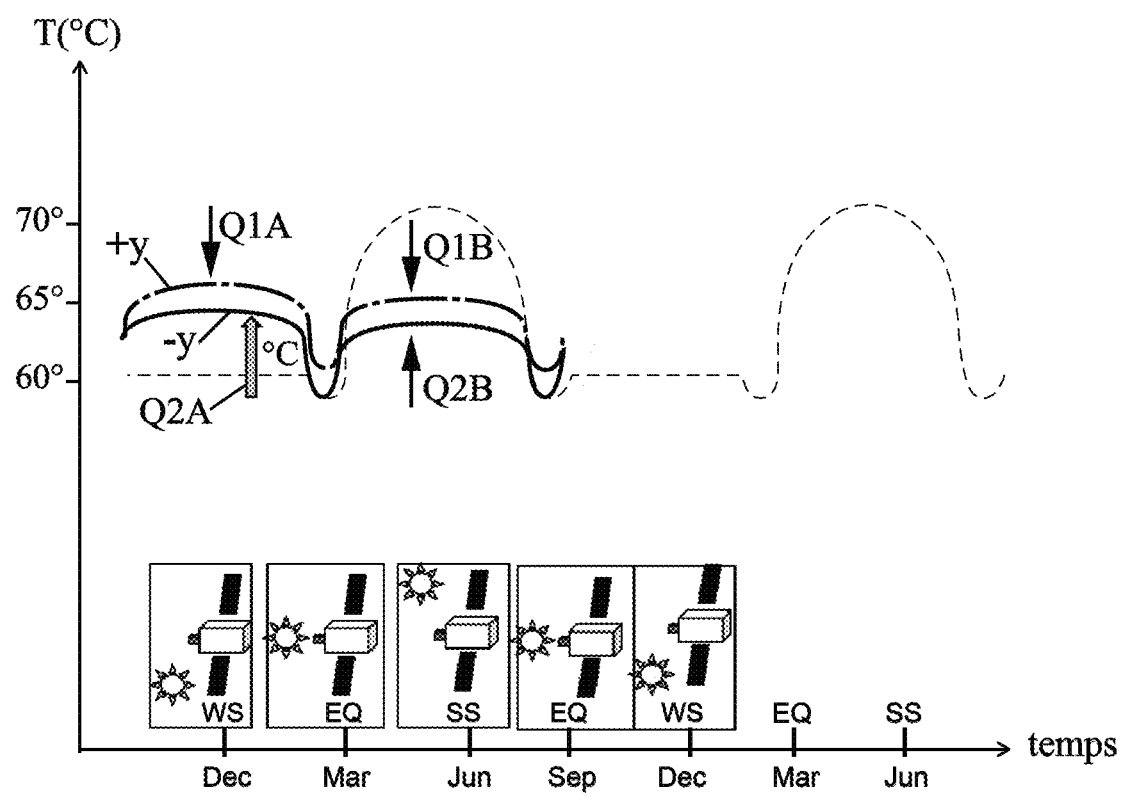
FIG. 22 shows two curves representative of the temperature variations of the +Y and −Y faces of the spacecraft illustrated in FIG. 21, over the course of a year.

FIGS. 20 to 22 illustrate a variant of the spacecraft 1. In this variant, the spacecraft 75 is similar to the spacecraft as described above except that the first 76 and second 78 auxiliary heat transfer devices are reversible or in other words bidirectional.

The elements of the spacecraft 75 according to this variant which are identical or similar to the elements of the spacecraft 1 described above will have the same references and will not be described a second time.

The first auxiliary heat transfer device 76 of this variant comprises a first heat exchanger assembly 80 in thermal contact with the first auxiliary radiator 32, a second heat exchanger 82 in thermal contact with the inner face of the second radiator 18, and heat pipes 84 (HP) connecting the first heat exchanger assembly 80 to the second heat exchanger 82. Reversible loops, in particular capillary loops where the reservoir of fluid is integrated into the evaporator (Loop Heat Pipe) may be used.

The first heat exchanger assembly 80 and the second heat exchanger 82 are adapted to operate as an evaporator or as a condenser. In FIGS. 8 and 9, the first heat exchanger assembly 80 and second heat exchanger 82 have been represented by a circle and a rectangle.

In this variant, the first heat exchanger assembly 80 may be implemented by a heat exchanger tube similar to the condenser tube 104 of FIG. 9, or by one or more heat exchangers and heat pipes 108 in thermal contact with the heat exchanger(s), as in the example of FIG. 10.

The first heat exchanger assembly is a heat conducting device within the meaning of the invention.

The constituent elements of the second auxiliary heat transfer device 78 are identical to the constituent elements of the first auxiliary heat transfer device 76 and will not be described in detail.

The first heat exchanger assembly 80 of the second auxiliary heat transfer device 78 is in thermal contact with the second auxiliary radiator 36. The second heat exchanger of the second auxiliary heat transfer device is in thermal contact with the inner face of the first radiator 16.

With reference to FIGS. 20 and 22, the first auxiliary radiator 32 and first auxiliary heat transfer device 76 assembly of the second embodiment of the invention ensure the same function during the winter solstice as the first auxiliary radiator 32 and first auxiliary heat transfer device 34 assembly of the first embodiment of the invention, namely to cool the second radiator 18. This assembly additionally ensures a supplemental function, during the winter solstice, of heating the first radiator 16 by transferring a quantity of energy Q2A from the second auxiliary radiator 36 to the inner main face 15 of the first radiator.

As can be seen in FIG. 22, this heating function makes it possible to further reduce the temperature differences between the first 7 and second 8 faces during the winter solstice.

In the same manner, with reference to FIGS. 21 and 22, the second auxiliary radiator 36 and second auxiliary heat transfer device 78 assembly of the second embodiment of the invention perform the same function as the second auxiliary radiator 36 and second auxiliary heat transfer device 78 assembly of the first embodiment of the invention, namely to cool the first radiator 16. This assembly further ensures a function of heating the second radiator 18 by transferring a quantity of energy Q2B from the first auxiliary radiator 32 to the inner main face 21 of the second radiator.

As can be seen in FIG. 22, this heating function makes it possible to reduce the temperature differences between the first 7 and second 8 faces during the summer solstice.

The various embodiments of the first and second auxiliary radiators may be used in this variant of the spacecraft.

The invention is applicable to different types of satellite missions in telecommunication, earth observation, or science. The invention has the advantage of being able to function for all types of orbits (GEO, LEO, MEO and HEO), and for different sizes of satellites (from nanosatellites to the very large satellites as illustrated in the invention).

Without loss of generality, the elements described in the invention may have other dimensions and offer the same functionalities.

The invention claimed is:

1. Spacecraft (1, 75) comprising:
a housing (2) defining an interior space (11) and an exterior space (13), the housing (2) having a north face (7), a south face (8) opposite to the north face (7), an east face (9), and a west face (10) opposite to the east face (9), an Earth face (5), and a zenith face (6) opposite to the Earth face (5),
a first radiator (16) carried by a face among the north face (7) and south face (8), and
a second radiator (18) carried by the other face among the north face (7) and south face (8),
the first radiator (16) and the second radiator (18) each having an inner main face (15, 21), an outer main face (17, 23) opposite to the inner main face (15, 21), longitudinal side faces (19, 25), and transverse side faces (191, 251),
wherein the spacecraft (1) further comprises a first auxiliary radiator (3, 118, 120, 124) and a first auxiliary heat transfer device (34, 76) thermally connecting said first auxiliary radiator (32, 118, 120, 124) to the inner main face (21) of the second radiator (18), the first auxiliary radiator (32, 118, 120, 124) being arranged in a first portion (46) of the exterior space (13), said first portion (46) being defined by the outer main face (17) of the first radiator and by first planes (48, 50, 52, 54) containing the side faces (19, 191) of the first radiator, and wherein said first auxiliary heat transfer device (34, 76) comprises a heat conducting device (42, 80), said first auxiliary radiator (32, 118, 120, 124) being composed solely of one or two radiating panels (100, 102) supporting said heat conducting device (42, 80), called carrier radiating panel(s).

2. Spacecraft (1, 75) according to claim 1, wherein said carrier radiating panel or panels (100) of the first auxiliary radiator (32, 118, 120, 124) have a width (L) comprised between 10 centimeters and 60 centimeters, said carrier radiating panel or panels (100) being arranged at a distance (D) comprised between 1 meter and 5.2 meters with respect to a plane containing the zenith face (6).

3. Spacecraft (1, 75) according to claim 1, wherein said carrier radiating panel or panels (100, 102) extend(s) perpendicularly to the first radiator (16), said carrier radiating panel or panels (100, 102) being at an angle comprised between 10° and 35° with respect to at least one face among the Earth face (6) and the zenith face (5).

4. Spacecraft (1, 75) according to claim 1, wherein said carrier panel or panels has (have) the shape of a rectangular trapezoid having an obtuse angle ($\rho$); said obtuse angle ($\rho$) being adjacent to a longitudinal side face (19) of the first radiator.

5. Spacecraft (1, 75) according to claim 1 comprising a solar panel (14) fixed on the north face (7), and wherein the first auxiliary radiator (32) is composed of two carrier radiating panels (100, 102) arranged relative to each other so as to form a V pointing towards said solar panel (14).

6. Spacecraft (1, 75) according to claim 1, wherein said first auxiliary radiator (118, 120, 124) is composed of a single carrier radiating panel (100) extending parallel to at least one face among the Earth face (6) and the zenith face (5).

7. Spacecraft (1, 75) according to claim 6, wherein said first auxiliary radiator (120, 124) comprises at least one radiating panel (122) without any heat conducting device, called non-carrier radiating panel or panels, said non-carrier radiating panel or panels (122) extending perpendicularly to at least one face among the north face (7) and the south face (8).

8. Spacecraft (1, 75) according to claim 7, wherein said non-carrier radiating panel or panels (122) extend(s) perpendicularly to at least one face among the zenith face (5) and the Earth face (6).

9. Spacecraft (1, 75) according to claim 7, wherein the carrier radiating panel (100) comprises a first main face (110), and a second main face (112) directed towards the Earth and opposite to the first main face (110), and wherein the non-carrier radiating panel or panels (122) is (are) fixed to the first main face (110).

10. Spacecraft (1, 75) according to claim 7, wherein said first auxiliary radiator (124) comprises a plurality of non-carrier radiating panels (122) having different widths, and wherein said non-carrier radiating panel (122) of greatest width is arranged in a central portion of the carrier radiating panel (100).

11. Spacecraft (1, 75) according to claim 1, wherein said first auxiliary radiator (118) is composed of a single radiating panel extending in a plane perpendicular to the first radiator (16) and to a face among the Earth face (6) and the zenith face (5).

12. Spacecraft (1, 75) according to claim 1, wherein said first auxiliary radiator (118) is composed of a single radiating panel extending in a plane perpendicular to a face among the Earth face (6) and the zenith face (5), said plane being at an angle of about 23.5 degrees relative to the first radiator (16).

13. Spacecraft (1, 75) according to claim 1, wherein the first auxiliary radiator is composed of two carrier radiating panels and two radiating panels without any heat conducting device, said carrier radiating panels being fixed to each other so that the midplane of one carrier radiating panel forms an acute angle with the midplane of the other carrier radiating panel, each carrier radiating panel further being fixed to a radiating panel without any heat conducting device so that the midplane of a carrier radiating panel forms an acute angle with the midplane of the radiating panel without any heat conducting device.

14. Spacecraft (1, 75) according to claim 1, wherein said carrier radiating panel or panels are implemented in a honeycomb structure.

15. Spacecraft (1, 75) according to claim 1, wherein at least one carrier radiating panel is covered with an optical solar reflector (OSR) type of coating.

16. The spacecraft of claim 2, wherein said carrier radiating panel or panels (100) of the first auxiliary radiator (32, 118, 120, 124) have a width (L) comprised between between 40 centimeters and 50 centimeters, said carrier radiating panel or panels (100) being arranged at a distance (D) comprised between 4.3 meters and 5 meters with respect to a plane containing the zenith face (6).

17. Spacecraft (1, 75) according to claim 2, wherein said carrier radiating panel or panels (100, 102) extend(s) perpendicularly to the first radiator (16), said carrier radiating panel or panels (100, 102) being at an angle comprised between 10° and 35° with respect to at least one face among the Earth face (6) and the zenith face (5).

18. Spacecraft (1, 75) according to claim 2, wherein said carrier panel or panels has (have) the shape of a rectangular trapezoid having an obtuse angle ($\rho$); said obtuse angle ($\rho$) being adjacent to a longitudinal side face (19) of the first radiator.

19. Spacecraft (1, 75) according to claim 3, wherein said carrier panel or panels has (have) the shape of a rectangular trapezoid having an obtuse angle ($\rho$); said obtuse angle ($\rho$) being adjacent to a longitudinal side face (19) of the first radiator.

20. Spacecraft (1, 75) according to claim 2 comprising a solar panel (14) fixed on the north face (7), and wherein the first auxiliary radiator (32) is composed of two carrier radiating panels (100, 102) arranged relative to each other so as to form a V pointing towards said solar panel (14).

\* \* \* \* \*